(12) United States Patent
Yamamoto

(10) Patent No.: US 9,260,093 B2
(45) Date of Patent: Feb. 16, 2016

(54) BRAKE APPARATUS AND BRAKING CONTROL APPARATUS

(75) Inventor: Takayuki Yamamoto, Aichi-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 2 days.

(21) Appl. No.: 14/364,033

(22) PCT Filed: Dec. 14, 2011

(86) PCT No.: PCT/JP2011/006998
§ 371 (c)(1),
(2), (4) Date: Jun. 9, 2014

(87) PCT Pub. No.: WO2013/088475
PCT Pub. Date: Jun. 20, 2013

(65) Prior Publication Data
US 2014/0305751 A1 Oct. 16, 2014

(51) Int. Cl.
*B60T 8/17* (2006.01)
*B60T 8/00* (2006.01)
*B60T 7/04* (2006.01)
*B60T 8/40* (2006.01)
*B60T 13/14* (2006.01)
*B60T 13/68* (2006.01)
*B60T 13/74* (2006.01)
*B60T 1/06* (2006.01)
*B60T 8/171* (2006.01)
*B60T 13/58* (2006.01)
*B60T 8/32* (2006.01)

(52) U.S. Cl.
CPC . *B60T 8/17* (2013.01); *B60T 1/065* (2013.01); *B60T 7/042* (2013.01); *B60T 8/00* (2013.01); *B60T 8/171* (2013.01); *B60T 8/4081* (2013.01); *B60T 13/146* (2013.01); *B60T 13/58* (2013.01); *B60T 13/686* (2013.01); *B60T 13/741* (2013.01); *B60T 8/32* (2013.01)

(58) Field of Classification Search
CPC ........... B60T 1/065; B60T 17/22; B60T 8/17; B60T 8/88; B60T 8/171
See application file for complete search history.

(56) References Cited

U.S. PATENT DOCUMENTS 5,221,128 A * 6/1993 Shimamura et al. ........ 303/116.1
2011/0315492 A1* 12/2011 Sakashita ..................... 188/72.1

FOREIGN PATENT DOCUMENTS

| JP | A-2007-100725 | 4/2007 |
| JP | A-2010-188942 | 9/2010 |
| JP | A-2012-126364 | 7/2012 |

* cited by examiner

*Primary Examiner* — Christopher Schwartz
(74) *Attorney, Agent, or Firm* — Oliff PLC

(57) ABSTRACT

A brake apparatus includes: a displacement member which is displaced with respect to a disk rotor; a friction member which presses the disk rotor by being pressed by the displacement member thus displaced so as to generate braking force; a hydraulic braking apparatus which displaces the displacement member using hydraulic pressure; an electric-powered braking apparatus which displaces the displacement member using a force that differs from the hydraulic pressure; and a brake ECU which controls the hydraulic braking apparatus based on information acquired from a detection unit which detects information having a correlation with the hydraulic pressure applied to the displacement member. When the electric-powered braking apparatus operates in a state in which braking is being performed by the hydraulic braking apparatus, the brake ECU controls the hydraulic braking apparatus or otherwise the electric-powered braking apparatus so as to suppress hydraulic pressure fluctuation.

12 Claims, 15 Drawing Sheets

BRAKE APPARATUS AND BRAKING CONTROL APPARATUS

CROSS-REFERENCE TO RELATED APPLICATIONS

This application is based upon and claims the benefit of priority from the prior International Patent Application No. PCT/JP2011/006998, filed on Dec. 14, 2011, the entire content of each of which is incorporated herein by reference.

TECHNICAL FIELD

The present invention relates to a brake apparatus, and particularly to a brake apparatus configured such that a piston included in a wheel cylinder is shared by a hydraulic braking apparatus and a parking brake apparatus.

BACKGROUND ART

A hydraulic disk brake is known, which is configured to supply hydraulic pressure generated in a hydraulic master cylinder or hydraulic pressure accumulated in an accumulator to a wheel cylinder provided to each wheel, according to a brake pedal operation value, thereby generating a regular braking force. With such a hydraulic disk brake, a friction pad is pressed into contact with a disk rotor by driving a piston via hydraulic pressure. Also, a conventional technique has been proposed in which such a wheel cylinder piston is also shared with a parking brake apparatus. For example, a disk brake has been proposed including a parking brake mechanism which operates using an electric motor as a driving source provided outside the wheel cylinder so as to hold the piston at a braking position (see Patent document 1, for example). That is to say, such a disk brake is configured to use both the hydraulic operating mechanism and the mechanical operating mechanism to drive the piston.

RELATED ART DOCUMENTS

Patent Documents

Japanese Patent Application Laid Open No. 2007-100725

DISCLOSURE OF THE INVENTION

Problem to be Solved by the Invention

With a hydraulic braking apparatus including a built-in caliper, when a parking brake is operated, the hydraulic pressure changes in the hydraulic braking apparatus. That is to say, after the piston is driven toward the disk rotor side as a result of operation of the parking brake, this leads to an increase in the fluid filling capacity of the hydraulic circuit according to the position of the piston thus driven. In this state, the hydraulic pressure detected by a hydraulic pressure sensor provided to the hydraulic circuit is lower than the hydraulic pressure estimated based on the brake pedal operation value. On the other hand, when the parking brake is released such that the piston is retracted so as to increase the distance between it and the disk rotor, this reduces the fluid filling capacity of the hydraulic circuit. In this state, the hydraulic pressure detected by the hydraulic pressure sensor is higher than the hydraulic pressure estimated based on the brake pedal operation value.

The brake apparatus monitors the hydraulic pressure at multiple points in the hydraulic circuit. When the hydraulic pressure thus detected deviates from the normal range which can be provided according to the brake pedal operation value, the brake apparatus judges that an abnormality has occurred in the brake apparatus. In this state, the brake apparatus executes an operation for switching a brake control mode, for example. Also, when the hydraulic pressure thus detected deviates from the normal range, in some cases, the brake apparatus suspends a particular operation such as an ABS control operation. Also, a brake apparatus is known in which, when the master cylinder pressure becomes higher than a predetermined threshold value, a brake assist operation is performed using a hydraulic pump. With such a brake apparatus, when the hydraulic pressure detected by a hydraulic pressure sensor becomes higher than a predetermined hydraulic pressure, the brake apparatus executes a brake assist operation.

Thus, in a case in which the hydraulic pressure fluctuates due to the operation and release of the parking brake, in some cases, this can have an effect on the aforementioned various kinds of braking control operations.

The present invention has been made in view of such a situation. Accordingly, it is a general purpose of the present invention to provide a technique for providing a high-precision braking control operation.

Means to Solve the Problem

In order to solve the aforementioned problem, a brake apparatus according to an embodiment of the present invention comprises: a displacement member configured to be displaced with respect to a disk rotor; a friction member configured to press the disk rotor by being pressed by the displacement member thus displaced; a hydraulic braking apparatus configured to displace the displacement member by means of hydraulic pressure; an electric-powered braking apparatus configured to displace the displacement member by means of a force that differs from the hydraulic pressure; and a control unit configured to control the hydraulic braking apparatus based on information acquired from a detection unit configured to detect information having a correlation with the hydraulic pressure applied to the displacement member. When the electric-powered braking apparatus operates in a state in which braking is being performed by means of the hydraulic braking apparatus, the control unit controls the hydraulic braking apparatus or otherwise the electric-powered braking apparatus so as to suppress fluctuation of the hydraulic pressure.

When the electric-powered braking apparatus operates in a state in which braking is being performed by means of the hydraulic braking apparatus, in some cases, the hydraulic pressure fluctuates due to the displacement of the displacement member. This leads to false detection by the control unit even if the driver has no intention to change the braking force. In this case, the control unit controls the hydraulic braking apparatus so as to compensate for the fluctuation of the hydraulic pressure. That is to say, an originally unnecessary braking control is executed. With the embodiment described above, when the electric-powered braking apparatus operates in a state in which braking is being performed by means of the hydraulic braking apparatus, such an arrangement suppresses the fluctuation of hydraulic pressure, thereby suppressing the execution and switching of unnecessary braking control.

Also, when the control unit acquires electric-powered braking apparatus operation start information in a state in which braking is being performed by means of the hydraulic braking apparatus, the control unit may switch the control operation of the hydraulic braking apparatus so as to raise responsiveness of the operation of the hydraulic braking apparatus to a higher level. Thus, such an arrangement is capable of suppressing fluctuation of the hydraulic pressure in an early stage when the electric-powered brake apparatus operates in a state in which braking is being performed by means of the hydraulic braking apparatus.

Also, the brake apparatus may further comprise a hydraulic pressure sensor configured as a detection unit which detects information having a correlation with the hydraulic pressure applied to the displacement member. Also, when the electric-powered braking apparatus is in a state in which it is not operating, the control unit may be configured to control the hydraulic braking apparatus based on an output value of the hydraulic pressure sensor using as a reference a target hydraulic pressure provided with a dead-band region having a first width. Also, when the control unit acquires the electric-powered braking apparatus operation start information in a state in which braking is being performed by means of the hydraulic braking apparatus, the control unit may be configured to control the hydraulic braking apparatus based on an output value of the hydraulic pressure sensor using as a reference a target hydraulic pressure provided with a dead-band region having a second width that is smaller than the first width. This raises the responsiveness of the operation of the hydraulic braking apparatus. Thus, such an arrangement is capable of suppressing fluctuation of the hydraulic pressure in an early stage when the electric-powered brake apparatus operates in a state in which braking is being performed by means of the hydraulic braking apparatus.

Also, when the electric-powered braking apparatus is in a state in which it is not operating, the control unit may be configured to control the hydraulic braking apparatus based on an output value of the hydraulic pressure sensor using as a reference a first target hydraulic pressure. Also, when the control unit acquires the electric-powered braking apparatus operation start information in a state in which braking is being performed by means of the hydraulic braking apparatus, the control unit may be configured to control the hydraulic braking apparatus based on an output value of the hydraulic pressure sensor using as a reference a second target hydraulic pressure that is greater than the first target hydraulic pressure. Such an arrangement temporarily raises the pressure difference between the sensor output value and the target hydraulic pressure. This increases the flow of the brake fluid so as to compensate for the pressure difference, thereby raising the responsiveness of the operation of the hydraulic braking apparatus. Thus, such an arrangement is capable of suppressing fluctuation of the hydraulic pressure in an early stage when the electric-powered brake apparatus operates in a state in which braking is being performed by means of the hydraulic braking apparatus.

Also, the brake apparatus may further comprise an electromagnetic control valve configured to control the flow of an operating fluid to be used to change the hydraulic pressure. Also, when the control unit acquires the electric-powered braking apparatus operation start information in a state in which braking is being performed by means of the hydraulic braking apparatus, the control unit may perform a control operation for supplying electric current to the electromagnetic control valve so as to raise the responsiveness of the electromagnetic control valve. This reduces the time lag from the transmission of an instruction to each electromagnetic control valve to open or close the valve up to the actual opening or closing of the valve. Thus, such an arrangement is capable of suppressing fluctuation of the hydraulic pressure in an early stage when the electric-powered brake apparatus operates in a state in which braking is being performed by means of the hydraulic braking apparatus. It should be noted that such an electromagnetic control valve may preferably be configured to perform a flow adjustment operation by means of a feedback control operation according to an output value received from a detection unit such as a pressure sensor or the like.

Also, when the control unit acquires the electric-powered braking apparatus operation start information in a state in which braking is being performed by means of the hydraulic braking apparatus, the control unit may perform an electric current supply control operation for supplying the electromagnetic control valve beforehand with an electric current having a current value which does not switch the open/closed state of the electromagnetic control valve before the open/close control operation for the electromagnetic control valve. This raises the responsiveness of the electromagnetic control valve.

Also, when the control unit acquires the electric-powered braking apparatus operation start information in a state in which braking is being performed by means of the hydraulic braking apparatus, the control unit may switch an operation gain of the electric-powered braking apparatus to a value that is smaller than a prior value. Such an arrangement is capable of reducing the rate of fluctuation of the hydraulic pressure even if the electric-powered apparatus starts to operate in a state in which braking is being performed by means of the hydraulic braking apparatus.

Also, the brake apparatus may further comprise a powered hydraulic pressure source configured to supply the operating fluid to each wheel cylinder provided with the displacement member. Also, the control unit may control the powered hydraulic pressure source so as to suppress a situation in which the powered hydraulic pressure source operates during operation of the electric-powered braking apparatus. This suppresses a situation in which the powered hydraulic pressure source and the electric-powered brake apparatus operate at the same time, thereby reducing operating noise. Also, in a case in which an electric motor or an electromagnetic valve is employed in the powered hydraulic pressure source, by suppressing a situation in which the powered hydraulic pressure source and the electric-powered brake apparatus operate at the same time, such an arrangement allows the voltage drop due to inrush current to be reduced.

Also, the powered hydraulic pressure source may comprise: an accumulator configured to accumulate pressure using the operating fluid; a pump configured to supply the operating fluid to the accumulator; and a motor configured to drive the pump. Also, when the control unit acquires the electric-powered braking apparatus operation start information in a state in which braking is being performed by means of the hydraulic braking apparatus, the control unit may switch the operating fluid supply start pressure at which the supply of the operating fluid to the accumulator by means of the pump is to be started, to a smaller value than the prior operating fluid supply start pressure. This reduces the frequency of operation of the powered hydraulic pressure source. Such an arrangement suppresses a situation in which the powered hydraulic pressure source and the electric-powered braking apparatus operate at the same time.

Also, when the control unit acquires the electric-powered braking apparatus operation start information in a state in which braking is being performed by means of the hydraulic braking apparatus, the control unit may switch the slope of a target hydraulic pressure used for a hydraulic pressure control operation for the hydraulic braking apparatus, to a value that is smaller than a value set beforehand. This suppresses the occurrence of a sudden flow of the operating fluid. Thus, such an arrangement reduces the flow noise when the operating fluid passes through the control valve, for example.

Also, the brake apparatus may further comprise: a wheel cylinder provided with the displacement member; and a hydraulic circuit configured such that it communicates with the wheel cylinder.

Also, the hydraulic braking apparatus may be configured to adjust the wheel cylinder hydraulic pressure according to an operation value of a brake pedal. Also, the electric-powered braking apparatus may be configured as a parking brake apparatus which mechanically transmits a driving force to the displacement member by means of the operation of the electric motor. Such an arrangement is capable of controlling the brake apparatus such that the hydraulic braking apparatus is able to operate without being easily affected by the fluctuation of hydraulic pressure due to the operation of the parking brake.

Another embodiment of the present invention relates to a braking control apparatus. The braking control apparatus is configured to control: a hydraulic braking apparatus configured to displace, by means of hydraulic pressure, a displacement member to be displaced with respect to a disk rotor; and an electric-powered braking apparatus configured to displace the displacement member by means of a force that differs from the hydraulic pressure. The control apparatus is configured to control the hydraulic braking apparatus based on information acquired from a detection unit configured to detect information having a correlation with the hydraulic pressure applied to the displacement member. When the electric-powered braking apparatus operates in a state in which braking is being performed by means of the hydraulic braking apparatus, the control apparatus is configured to control the hydraulic braking apparatus or otherwise the electric-powered braking apparatus so as to suppress fluctuation of the hydraulic pressure.

When the electric-powered braking apparatus operates in a state in which braking is being performed by means of the hydraulic braking apparatus, in some cases, the hydraulic pressure fluctuates due to the displacement of the displacement member. This leads to false detection by the control unit even if the driver has no intention to change the braking force. In this case, the control unit controls the hydraulic braking apparatus so as to compensate for the fluctuation of the hydraulic pressure. That is to say, an originally unnecessary braking control is executed. With the present embodiment, when the electric-powered braking apparatus operates in a state in which braking is being performed by means of the hydraulic braking apparatus, such an arrangement suppresses the fluctuation of hydraulic pressure, thereby suppressing the execution and switching of unnecessary braking control.

Advantage of the Present Invention

The present invention provides a high-precision braking control operation.

BEST MODE FOR CARRYING OUT THE INVENTION

Figure 1:
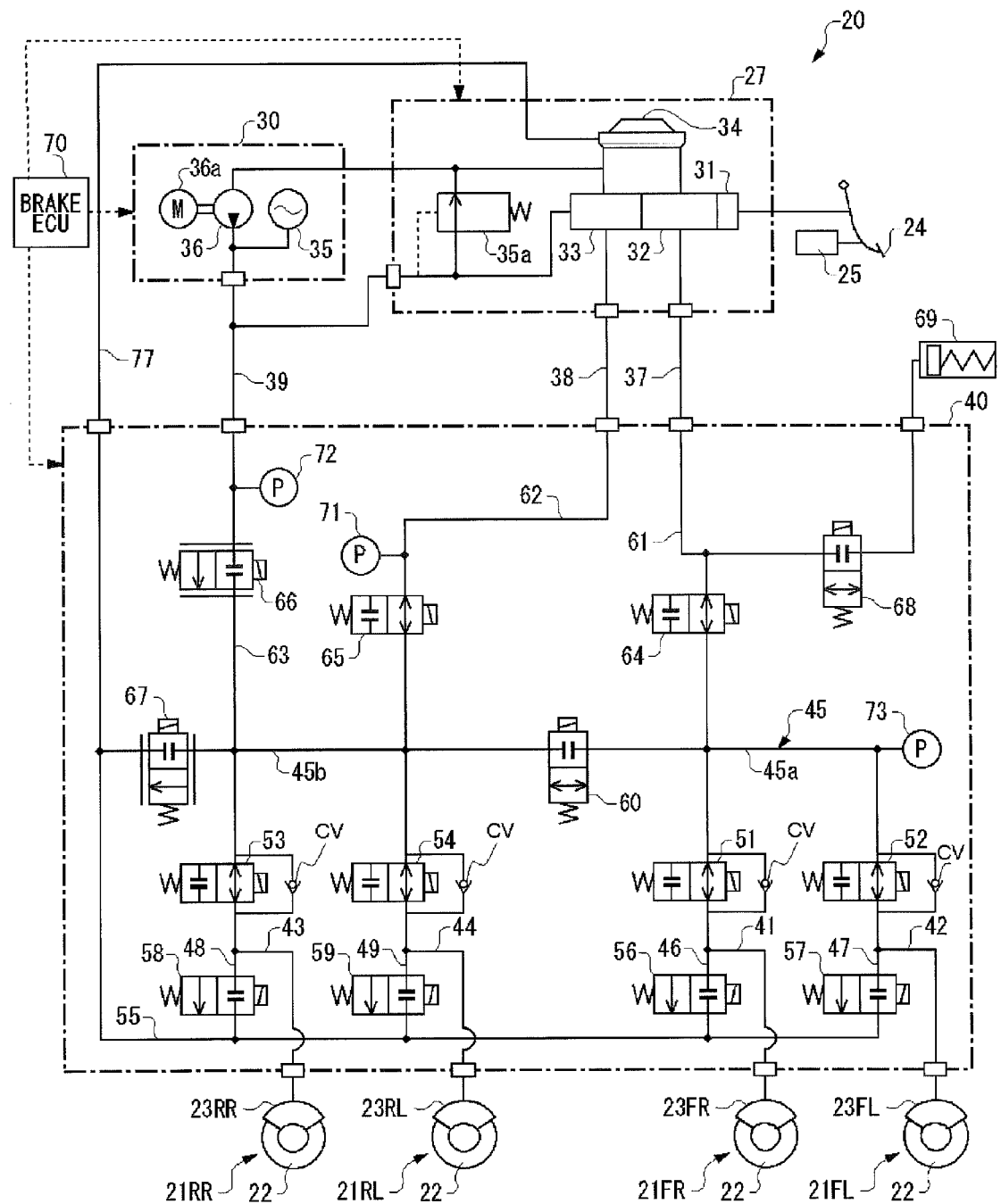
FIG. 1 is a system diagram showing a brake apparatus according to a first embodiment.

Detailed description will be made below with reference to the drawings regarding an embodiment for realizing the present invention. It should be noted that, in the drawings, the same components are denoted by the same reference symbols, and redundant description thereof will be omitted as appropriate. A brake apparatus described in the following embodiment may be applied to a vehicle brake apparatus. In particular, the brake apparatus described in the following embodiment may suitably be applied to a disk brake having a parking brake mechanism.

Also, the brake apparatus according to each embodiment may be mounted on a hybrid vehicle including both an electric motor and an internal-combustion engine each configured as a driving source. Such a hybrid vehicle is capable of performing a vehicle braking operation using both a regenerative braking mechanism in which braking is performed for the vehicle by regenerating electric energy from the kinetic energy of the vehicle, and a hydraulic braking mechanism by means of a brake apparatus. A vehicle according to the present embodiment is capable of executing cooperative control of the braking mechanism and the regenerative mechanism in which the braking force is generated at a desired level using the regenerative braking mechanism and the hydraulic braking mechanism in combination. It should be noted that such a brake apparatus may use only the hydraulic braking mechanism to generate the braking force at a desired level.

[First Embodiment]

FIG. 1 is a system diagram showing a brake apparatus 20 according to a first embodiment. The brake apparatus 20 shown in FIG. 1 includes disk brake units 21FR, 21FL, 21RR, and 21RL, provided corresponding to the respective wheels, a master cylinder unit 27, a powered hydraulic pressure source 30, and a hydraulic actuator 40. The master cylinder unit 27, the powered hydraulic pressure source 30, and the hydraulic actuator 40 form a hydraulic circuit. Detailed description will be made below with reference to FIG. 1 regarding a configuration of the brake apparatus 20.

The disk brake units 21FR, 21FL, 21RR, and 21RL supply a braking force to the right front wheel, the left front wheel, the right rear wheel, and the left rear wheel, respectively. The master cylinder unit 27 configured as a manual hydraulic pressure source is capable of supplying a brake fluid pressurized according to a value input by the driver by operating the brake pedal 24, configured as a brake operating member, to the disk brake units 21FR, 21FL, 21RR, and 21RL (which will be referred to as the "disk brake units 21FR through 21RL" as appropriate). The powered hydraulic pressure source 30 is capable of supplying the brake fluid pressurized by receiving the supply of the driving force provided by a motor or the like, to the disk brake units 21FR through 21RL, independently of the operation by the driver via the brake pedal 24.

The hydraulic actuator 40 appropriately adjusts the hydraulic pressure of the brake fluid supplied from the powered hydraulic pressure source 30 or the master cylinder unit 27, and supplies the brake fluid thus adjusted to the disk brake units 21FR through 21RL.

Description will further be made below in detail regarding the disk brake units 21FR through 21RL, the master cylinder unit 27, the powered hydraulic pressure source 30, and the hydraulic actuator 40. The disk brake units 21FR through 21RL each include a disk rotor 22 and wheel cylinders 23FR, 23FL, 23RR, or 23RL built into an unshown brake caliper. With such an arrangement, the wheel cylinders 23FR, 23FL, 23RR, and 23RL are each connected to the hydraulic actuator 40 via different respective fluid paths. It should be noted that the wheel cylinders 23FR, 23FL, 23RR, and 23RL will collectively be referred to as the "wheel cylinders 23" hereafter.

With the disk brake units 21FR through 21RL, when the brake fluid is supplied to the wheel cylinder 23 from the hydraulic actuator 40, a piston, which is configured as a pressing member arranged in the wheel cylinder 23, is driven by the hydraulic pressure. In this state, a brake pad configured as a friction member is pressed into contact with the disk rotor 22 which rotates together with the wheel. This supplies a braking force to each wheel. It should be noted that description is being made in the present embodiment regarding an arrangement employing the disk brake units 21FR through 21RL. Also, the present embodiment may employ other kinds of braking force supply mechanisms including a wheel cylinder 23 such as a drum brake, drum-in-disk brake, drum-in-drum brake, or the like.

In the present embodiment, the master cylinder unit 27 is configured as a master cylinder provided with a hydraulic booster. The master cylinder unit 27 includes a hydraulic booster 31, a master cylinder 32, a regulator 33, and a reservoir 34. The hydraulic booster 31 boosts the brake pedal force applied to the brake pedal 24, and transmits the brake pedal force thus boosted to the master cylinder 32. By supplying the brake fluid to the hydraulic booster 31 from the powered hydraulic pressure source 30 via the regulator 33, the brake pedal force is boosted. With such an arrangement, the master cylinder 32 generates a master cylinder pressure having a predetermined boosting ratio with respect to the brake pedal force.

The reservoir 34 configured to reserve the brake fluid is arranged above the master cylinder 32 and the regulator 33. When the depression of the brake pedal 24 has been released, the master cylinder 32 communicates with the reservoir 34. It should be noted that, when the brake pedal 24 has been depressed, the communication between the master cylinder 32 and the reservoir 34 is shut off. On the other hand, the regulator 33 is configured to communicate with both the reservoir 34 and the accumulator 35 of the powered hydraulic pressure source 30. The regulator 33 uses the reservoir 34 as a low pressure source and uses the accumulator 35 as a high pressure source. The regulator 33 generates a hydraulic pressure which is approximately equal to the master cylinder pressure. The hydraulic pressure thus generated by the regulator 33 will be referred to as the "regulator pressure" hereafter as appropriate.

The powered hydraulic pressure source 30 includes a pump 36 and the accumulator 35. The pump 36 includes a motor 36a as a driving source. The pump 36 is arranged such that its inlet is connected to the reservoir 34, and its outlet is connected to the accumulator 35, so as to boost the brake fluid. The accumulator 35 is configured as an accumulating apparatus which converts the pressure energy of the brake fluid boosted by the pump 36 into the pressure energy of an enclosed gas such as nitrogen gas or the like having a pressure on the order of 14 to 22 MPa, for example.

Furthermore, the accumulator 35 is connected to a relief valve 35a provided to the master cylinder unit 27. When the pressure of the brake fluid stored in the accumulator 35 is abnormally high, e.g., on the order of 25 MPa, the relief valve 35a is opened such that the high-pressure brake fluid is returned to the reservoir 34.

As described above, with the brake apparatus 20, the master cylinder 32, the regulator 33, and the accumulator 35 each function as a brake fluid source with respect to the wheel cylinder 23. Furthermore, a master pipe 37 is connected to the master cylinder 32. A regulator pipe 38 is connected to the regulator 33. An accumulator pipe 39 is connected to the accumulator 35.

The master pipe 37, the regulator pipe 38, and the accumulator pipe 39 are each connected to the hydraulic actuator 40. That is to say, the master cylinder 32, the regulator 33, and the accumulator 35 are each connected to the hydraulic actuator 40 in parallel as a hydraulic pressure source for the wheel cylinders 23. The master cylinder unit 27, the powered hydraulic pressure source 30, and the hydraulic actuator 40 form a hydraulic braking apparatus configured to displace the piston arranged in each wheel cylinder 23 via the hydraulic pressure so as to press the brake pad into contact with the disk rotor 22, thereby generating the braking force. With the present embodiment, the hydraulic braking apparatus is an apparatus which adjusts the hydraulic pressure of the wheel cylinder 23 according to the operation value of the brake pedal 24, and functions as a first driving source. It should be noted that, as described later, the hydraulic actuator 40 supplies the hydraulic pressure supplied from either one of the master cylinder unit 27 or the powered hydraulic pressure source 30 to the disk brake unit 21. Thus, a combination of the powered hydraulic pressure source 30 and the hydraulic actuator 40 and a combination of the master cylinder unit 27 and the hydraulic actuator 40 can each be referred to as the "first driving source".

With the present embodiment, the hydraulic actuator 40 configured as an operating fluid (brake fluid) supply system includes an actuator block having multiple flow paths formed in it and multiple electromagnetic control valves. The flow paths formed in the actuator block include a main flow path 45 and dedicated flow paths 41, 42, 43, and (which will be referred to as the "dedicated flow paths 41 through 44" hereafter as appropriate).

The dedicated flow paths 41 through 44 are each branched from the main flow path 45. The dedicated flow paths 41 through 44 are connected to the wheel cylinders 23FR, 23FL, 23RR, and 23RL of the disk brake units 21FR, 21FL, 21RR, and 21RL, respectively. The dedicated flow paths 41 through 44 allow each wheel cylinder 23 to independently communicate with the main flow path 45.

Furthermore, ABS holding valves 51, 52, 53, and (which will be referred to as the "ABS holding valves 51 through 54" hereafter as appropriate) are provided to an intermediate position on the respective dedicated flow paths 41, 42, 43, and 44. The ABS holding valves 51 through 54 each include an on/off controllable solenoid and a spring. The ABS holding valves 51 through 54 are each configured as a normally-open electromagnetic control valve which is opened when electric power is not supplied to the solenoid.

The ABS holding valves 51 through 54 are each configured such that, when it is in the open state, it allows the brake fluid to flow in either direction. Typically, each ABS holding valve allows the brake fluid to be supplied to the wheel cylinder 23 from the main flow path 45, thereby supplying the hydraulic pressure to the wheel cylinder 23. Conversely, each ABS holding valve allows the brake fluid to flow from the wheel cylinder 23 to the main flow path 45. When electric power is supplied to each solenoid so as to close the ABS holding valves 51 through 54, the flow of the brake fluid via the dedicated flow paths 41 through 44 is shut off, thereby shutting off the supply of the hydraulic pressure. It should be noted that a check valve CV is provided to each of the ABS holding valves 51 through 54. Each check valve CV allows the brake fluid to flow from the wheel cylinder 23 to the main flow path 45, and shuts off the flow in the reverse direction.

Furthermore, the wheel cylinders 23 are each connected to a reservoir flow path 55 via respective pressure reducing paths 46, 47, 48, and 49, (which will be referred to as the "pressure reducing paths 46 through 49" hereafter as appropriate) respectively connected to the dedicated flow paths 41 through 44, which allows the brake fluid to be returned to the reservoir 34. ABS pressure reducing valves 56, 57, 58, and 59 (which will be referred to as the "ABS pressure reducing valves 56 through 59" hereafter as appropriate) are each provided to an intermediate position on the respective pressure reducing paths 46, 47, 48, and 49.

The ABS reducing valves 56 through 59 each include an on/off controllable solenoid and a spring. The ABS reducing valves 56 through 59 are each configured as a normally-closed electromagnetic control valve which is closed when electric power is not supplied to the solenoid. When one from among the ABS pressure reducing valves 56 through 59 is in the closed state, the flow of the brake fluid via the corresponding one from among the pressure reducing paths 46 through 49 is shut off.

When electric power is applied to each solenoid so as to open the ABS pressure reducing valves 56 through 59, the flow of the brake fluid via the pressure reducing paths 46 through 49 is enabled. In this state, the brake fluid is returned to the reservoir 34 from the wheel cylinders 23 via the pressure reducing paths 46 through 49 and the reservoir flow path 55. Specifically, the hydraulic pressure in the wheel cylinder 23 is reduced from the high pressure state to the low pressure state. It should be noted that the reservoir flow path 55 is connected to the reservoir 34 of the master cylinder unit 27 via a reservoir pipe 77.

An isolation valve 60 is included at an intermediate position on the main flow path 45 (it should be noted that, while the isolation valve is also referred to as a "communication valve", the term "isolation valve" will be employed in this specification). The isolation valve 60 allows the main flow path 45 to be partitioned into a first flow path 45*a* connected to the dedicated flow paths 41 and 42 and a second flow path 45*b* connected to the dedicated flow paths 43 and 44. The first flow path 45*a* is connected to the front wheel side wheel cylinders 23FR and 23FL via the dedicated flow paths 41 and 42. The second flow path 45*b* is connected to the rear wheel side wheel cylinders 23RR and 23RL via the dedicated flow paths 43 and 44. That is to say, the isolation valve 60 is an electromagnetic control valve having a function of enabling and shutting off the communication between the front wheel side wheel cylinders 23FR and 23FL and the rear wheel side wheel cylinders 23RR and 23RL.

The isolation valve 60 includes an on/off controllable solenoid and a spring. The isolation valve 60 is configured as a normally-closed electromagnetic control valve which is closed when electric power is not supplied to the solenoid. When the isolation valve 60 is in the closed state, the isolation valve 60 shuts off the flow of the brake fluid via the main flow path 45. When electric power is supplied to the solenoid so as to open the isolation valve 60, the isolation valve 60 enables the brake fluid to flow in either direction between the first flow path 45*a* and the second flow path 45*b*.

Furthermore, with the hydraulic actuator 40, a master flow path 61 and a regulator flow path 62 are formed such that they communicate with the main flow path 45. More specifically, the master flow path 61 is connected to the first flow path 45*a* of the main flow path 45. The regulator flow path 62 is connected to the second flow path 45*b* of the main flow path 45. Furthermore, the master flow path 61 is connected to the master pipe 37, which communicates with the master cylinder 32. The regulator flow path 62 is connected to the regulator pipe 38 that communicates with the regulator 33.

A master cut valve 64 is included at an intermediate position on the master flow path 61. The master cut valve 64 includes an on/off controllable solenoid and a spring. The master cut valve 64 is configured as a normally-open electromagnetic control valve which is open when electric power is not supplied to the solenoid. When the master cut valve 64 is set to the open state, the master cut valve 64 enables the brake fluid to flow in either direction between the master cylinder 32 and the first flow path 45*a* of the main flow path 45. When electric power is supplied to the solenoid so as to close the master cut valve 64, the master cut valve 64 shuts off the flow of the brake fluid via the master flow path 61. Specifically, this shuts off the supply of the hydraulic pressure to the first flow path 45*a* from the master cylinder 32.

Furthermore, a stroke simulator 69 is connected to the master flow path 61 via a simulator cut valve 68 on the upstream side with respect to the master cut valve 64. That is to say, the simulator cut valve 68 is provided to a flow path that connects the master cylinder 32 and the stroke simulator 69. The simulator cut valve 68 is configured as a normally-closed electromagnetic control valve which is closed when electric power is not supplied to the solenoid.

When the simulator cut valve 68 is in the closed state, the simulator cut valve 68 shuts off the flow of the brake fluid between the master flow path 61 and the stroke simulator 69. When electric power is supplied to the solenoid so as to open the simulator cut valve 68, the simulator cut valve 68 enables the brake fluid to flow in either direction between the master cylinder 32 and the stroke simulator 69.

With such an arrangement, the stroke simulator 69 includes multiple pistons and multiple springs, and is configured to generate a reaction force according to the force applied to the brake pedal 24 by the driver when the simulator cut valve 68 is open. The stroke simulator 69 preferably has a multi-step spring constant so as to improve the feeling of break operation by the driver.

Furthermore, a regulator cut valve 65 is included at an intermediate position on the regulator flow path 62. The regulator cut valve 65 also includes an on/off controllable solenoid and a spring. The regulator cut valve 65 is configured as a normally-open electromagnetic control valve which is open when electric power is not supplied to the solenoid. When the regulator cut valve 65 is set to the open state, the regulator cut valve 65 enables the brake fluid to flow in either direction between the regulator 33 and the second flow path 45b of the main flow path 45. When electric power is supplied to the solenoid so as to close the regulator cut valve 65, the regulator cut valve 65 shuts off the flow of the brake fluid via the regulator flow path 62. Specifically, this shuts off the supply of the hydraulic pressure to the second flow path 45b from the regulator 33.

An accumulator flow path 63 is also formed in the hydraulic actuator 40, in addition to the master flow path 61 and the regulator flow path 62. The downstream side end of the accumulator flow path 63 is connected to the second flow path 45b of the main flow path 45. The other end of the accumulator flow path 63, i.e., the upstream side end of the accumulator flow path 63, is connected to the accumulator pipe 39, which communicates with the accumulator 35.

A booster linear control valve (which is also referred to as a "linear booster valve") 66 is included at an intermediate position on the accumulator flow path 63. Furthermore, the accumulator flow path 63 and the second flow path 45b of the main flow path 45 are connected to the reservoir flow path 55 via a pressure reducing linear control valve (which is also referred to as a "linear pressure reducing valve") 67. The booster linear control valve 66 and the pressure reducing linear control valve 67 each include a linear solenoid and a spring. These control valves are each configured as a normally-closed electromagnetic control valve which is closed when electric power is not supplied to the solenoid. The booster linear control valve 66 and the pressure reducing linear control valve 67 are each configured such that its valve aperture is adjusted in proportion to the current supplied to the corresponding solenoid. It should be noted that, in the following description, the booster linear control valve 66 and the pressure reducing linear control valve 67 are hereafter collectively referred to as "linear control valves" as appropriate.

The booster linear control valve 66 is provided as a booster control valve shared by the multiple wheel cylinders 23 provided to the respective wheels. As with the booster linear control valve 66, the pressure reducing linear control valve 67 is provided as a pressure reducing control valve shared by the respective wheel cylinders 23. That is to say, with the present embodiment, the booster linear control valve 66 and the pressure reducing linear control valve 67 are provided as a pair of shared control valves configured to control the supply of the operating fluid transmitted from the powered hydraulic pressure source 30 to the respective wheel cylinders 23. Specifically, when the booster linear control valve 66 is open, the hydraulic pressure from the accumulator 35 is supplied to the second flow path 45b, thereby raising the hydraulic pressure in the second flow path 45b. On the other hand, when the pressure reducing linear control valve 67 is open, the brake fluid in the second flow path 45b is discharged, thereby reducing the hydraulic pressure in the second flow path 45b.

The pressure difference between the upstream side and the downstream side of the booster linear control valve 66 (i.e., the inlet/outlet pressure difference) approximately corresponds to the pressure difference between the pressure of the brake fluid in the accumulator 35 and the pressure of the brake fluid in the main flow path 45. The pressure difference between the upstream side and the downstream side of the pressure reducing linear control valve 67 corresponds to the pressure difference between the pressure of the brake fluid in the main flow path 45 and the pressure of the brake fluid in the reservoir 34. It should be noted that, in actuality, in a transition period in which the brake fluid flows according to the opening and closing of the booster linear control valve 66, the booster linear control valve 66 receives a pressure reducing effect due to the orifice resistance or the like.

With such an arrangement, with the electromagnetic driving force generated according to the electric power supplied to the linear solenoid of the booster linear control valve 66 or otherwise the pressure reducing linear control valve 67 as F1, with the force applied from the spring as F2, and with the pressure difference force that occurs according to the pressure difference between the inlet and the outlet of the booster linear control valve 66 or otherwise the pressure reducing linear control valve 67 as F3, the relation F1+F3=F2 holds true. Thus, by continuously controlling the electric power supplied to the linear solenoid of the booster linear control valve 66 and the electric power supplied to the linear solenoid of the pressure reducing linear control valve 67, such an arrangement allows the control of the inlet/outlet pressure difference that occurs in the booster linear control valve 66 and the pressure reducing linear control valve 67.

In the brake apparatus 20, the powered hydraulic pressure source 30 and the hydraulic actuator 40 are each controlled by a brake ECU 70 configured as an electronic control unit according to the present embodiment. The brake ECU 70 is configured as a microprocessor including a CPU. The ECU 70 includes ROM which stores various kinds of programs, RAM which temporarily stores data, an input/output port, a communication port, and the like, in addition to the CPU. Also, the brake ECU 70 may include rewritable flash memory or the like configured as a storage unit, thereby providing a version upgrade function or an update function in maintenance such as firmware updating.

Furthermore, the brake ECU 70 is capable of communicating with a hybrid ECU configured as a higher-level CPU. The brake ECU 70 is capable of controlling the pump 36 of the powered hydraulic pressure source 30 and the electromagnetic control valves 51 through 54, 56 through 59, 60, and 64 through 68, which form the hydraulic actuator 40, so as to control the hydraulic braking force according to a control signal received from the hybrid CPU and signals received from various kinds of sensors.

Furthermore, the brake ECU 70 is connected to hydraulic pressure sensors such as a regulator pressure sensor 71, an accumulator pressure sensor 72, a control pressure sensor 73, and the like. The regulator pressure sensor 71 detects the pressure of the brake fluid in the regulator flow path 62 on the upstream side of the regulator cut valve 65, i.e., the regulator pressure, at a predetermined sampling cycle, and supplies, to the brake ECU 70, a regulator pressure detection signal which represents the detected value.

Moreover, the accumulator pressure sensor 72 detects the pressure of the brake fluid in the accumulator flow path 63 on the upstream side of the booster linear control valve 66, i.e., the accumulator pressure, at a predetermined sampling cycle, and supplies, to the brake ECU 70, an accumulator pressure detection signal which represents the detected value.

Moreover, the control pressure sensor 73 detects the pressure of the brake fluid in the first flow path 45a of the main flow path 45 at a predetermined sampling cycle, and supplies, to the brake ECU 70, a signal which represents the detected value. On the other hand, when the isolation valve 60 is open such that the first flow path 45a and the second flow path 45b communicate with each other, the control pressure sensor 73 detects the pressure of the brake fluid in the main flow path 45. The pressure sensors 71 through 73 each sample a detection value at a predetermined cycle (e.g., every 3 msec), and each supplies the detection value thus sampled to the brake ECU 70. A predetermined amount of the detection values thus received from the pressure sensors is stored in a predetermined storage area of the brake ECU 70.

Thus, when the isolation valve 60 is set to the open state such that the first flow path 45a and the second flow path 45b of the main flow path 45 communicate with each other, the output value of the control pressure sensor 73 indicates the hydraulic pressure of the lower-pressure side (downstream side) of the booster linear control valve 66. At the same time, the output value of the control pressure sensor 73 indicates the hydraulic pressure of the higher-pressure side (upstream side) of the pressure reducing linear control valve 67. Thus, the output value of the control pressure sensor 73 may be used to control the booster linear control valve 66 and the pressure reducing linear control valve 67.

When both the booster linear control valve 66 and the pressure reducing linear control valve 67 are closed, and when the master cut valve 64 is set to the open state, the output value of the control pressure sensor 73 represents the hydraulic pressure in the master cylinder 32 (which will be referred to as the "master cylinder pressure" hereafter as appropriate). When the isolation valve 60 is opened such that the first flow path 45a and the second flow path 45b of the main flow path 45 communicate with each other, when the ABS holding valves 51 through 54 are each open, and when the ABS pressure reducing valves 56 through 59 are each closed, the output value of the control pressure sensor 73 represents the fluid pressure applied to each wheel cylinder 23, i.e., the wheel cylinder pressure.

The sensors connected to the brake ECU 70 also include a stroke sensor 25 provided to the brake pedal 24. The stroke sensor 25 detects a pedal stroke, which is the value input by the driver by operating the brake pedal 24, and supplies, to the brake ECU 70, a signal which represents the stroke value thus detected. The output value of the stroke sensor 25 is sampled at a predetermined intervals of time, and is supplied to the brake ECU 70. A predetermined amount of the output values thus received from the stroke sensor 25 is stored in a predetermined storage area of the brake ECU 70.

It should be noted that the brake operating state detection mechanism is not restricted to such a stroke sensor 25. Also, another kind of brake operating state detection mechanism may be connected to and provided to the brake ECU 70, in addition to or otherwise instead of the stroke sensor 25. Examples of such brake operating state detection mechanisms include: a brake pedal force sensor which detects the force applied to the brake pedal 24, a hydraulic pressure sensor, a brake lamp switch which detects whether or not the brake pedal 24 is depressed, and the like. Furthermore, the sensors connected to the brake ECU 70 also include an unshown wheel speed sensor and the like. The wheel speed sensor samples a detection signal which represents the wheel speed at predetermined intervals of time, and supplies the detection signal thus sampled to the brake ECU 70. A predetermined amount of the wheel speed detection signal thus received is stored in a predetermined storage area of the brake ECU 70.

The brake operating input mechanism is not restricted to such a brake pedal 24 configured as a brake operating member. Also, a pushbutton may be employed as such a brake operating input mechanism. In a case in which such a pushbutton is employed as a brake operating input mechanism, examples of brake operating state detection mechanisms may include: a pushing pressure sensor which detects the force applied to the pushbutton; a pushbutton switch which detects whether or not the pushbutton is pushed to a predetermined depth; and the like, in addition to a stroke sensor which detects the stroke applied to the pushbutton.

The brake apparatus 20 configured as described above is set to a control mode from among at least two control modes, i.e., a linear control mode and a hydraulic booster mode. In the linear control mode, the brake fluid is supplied from the powered hydraulic pressure source 30 to the hydraulic circuit. In the hydraulic booster mode, the brake fluid is supplied from the master cylinder unit 27 to the hydraulic circuit. It should be noted that the linear control mode and the hydraulic booster mode will be described for exemplary purposes only for describing a mode in which the powered hydraulic pressure source 30 functions as a brake fluid supply source and a mode in which the master cylinder unit 27 functions as a brake fluid supply source. The control mode used in the brake apparatus 20 is by no means restricted by the following description.

In the normal driving operation, the brake ECU 70 controls the braking force in the linear control mode. When an abnormality is detected in the hydraulic pressure or the like, the brake apparatus 20 switches the control mode from the linear control mode to the hydraulic booster mode, and controls the braking force in the hydraulic booster mode thus switched. In the hydraulic booster mode, the hydraulic pressure generated according to the driver's operation of the brake pedal is transmitted to the wheel cylinders 23, thereby generating the braking force.

In the linear control mode, each wheel cylinder 23 is shut off from the master cylinder unit 27. That is to say, the brake ECU 70 sets the master cut valve 64 and the regulator cut valve 65 to the closed state so as to shut off the supply of the brake fluid to the main flow path 45 from the master cylinder 32 and the regulator 33. Furthermore, the brake ECU 70 sets the simulator cut valve 68 to the open state in order to allow the brake fluid transmitted from the master cylinder 32 to be supplied to the stroke simulator 69 according to the driver's operation of the brake pedal 24. Furthermore, the brake ECU 70 sets the isolation valve 60 to the open state.

In the linear control mode, the brake ECU 70 calculates the hydraulic braking force (specifically, the frictional braking force) to be generated by the brake apparatus 20, by subtracting the regenerative braking force from the requested braking force as indicated by the driver's depressing the brake pedal 24. The value of the regenerative braking force is supplied to the brake ECU 70 from the hybrid ECU.

Subsequently, the brake ECU 70 calculates the target hydraulic pressure of each of the wheel cylinders 23FR through 23RL based on the hydraulic braking force thus calculated. The brake ECU 70 determines the current value to be supplied to the booster linear control valve 66 (pressure increasing instruction current value) and the current value to be supplied to the pressure reducing linear control valve 67 (pressure reducing instruction current value) by means of a feedback control operation.

As a result, with the brake apparatus 20, the brake fluid is supplied to each wheel cylinder 23 from the powered hydraulic pressure source 30 via the booster linear control valve 66, thereby providing each wheel with the hydraulic braking force according to a predetermined target value. Furthermore, the brake fluid is discharged as necessary from each wheel cylinder 23 via the pressure reducing linear control valve 67, thereby adjusting the hydraulic braking force applied to each wheel as appropriate. As described above, in the linear control mode, cooperative control of the braking mechanism and regenerative mechanism is performed in which the requested braking force is generated using the hydraulic control mechanism and the regenerative braking mechanism in combination. It should be noted that the cooperative control of the braking mechanism and the regenerative mechanism is performed in hybrid vehicles. The brake apparatus 20 may not necessarily execute cooperative control of the braking mechanism and the regenerative mechanism. In this case, the brake ECU 70 calculates the hydraulic braking force to be generated by the brake apparatus 20 based on only the requested braking force as indicated by the driver's depressing the brake pedal 24.

On the other hand, in the hydraulic booster mode, the brake ECU 70 suspends the supply of electric power so as to set each of the master cut valve 64 and the regulator cut valve 65 to the open state, and so as to set each of the isolation valve 60 and the simulator cut valve 68 to the closed state. As a result, the master cylinder pressure is transmitted to the front wheel side wheel cylinders 23FR and 23FL, and the regulator pressure is transmitted to the rear wheel side wheel cylinders 23RR and 23RL, thereby providing each wheel with the braking force. As described above, with the brake apparatus 20 according to the present embodiment, the hydraulic booster mode is used as a backup control mode used in a case in which the linear control mode is not executed due to the occurrence of an abnormality or the like.

The brake apparatus 20 described in the present embodiment includes a parking brake apparatus connected to a brake hydraulic circuit in the manner of a so-called built-in caliper such as a built-in disk type brake mechanism, drum-in-drum type brake mechanism, or the like. With the embodiment, the parking brake apparatus operates an electric motor so as to mechanically transmit the driving force to the piston of each wheel cylinder 23, thereby displacing the piston of each wheel cylinder 23. With the present embodiment, the parking brake apparatus functions as an electrically-driven braking apparatus configured as a second driving source. As described above, the brake apparatus 20 has a configuration in which the piston of each wheel cylinder 23 is shared by the first driving source (hydraulic braking apparatus) and the second driving source (parking brake apparatus).

Figure 2:
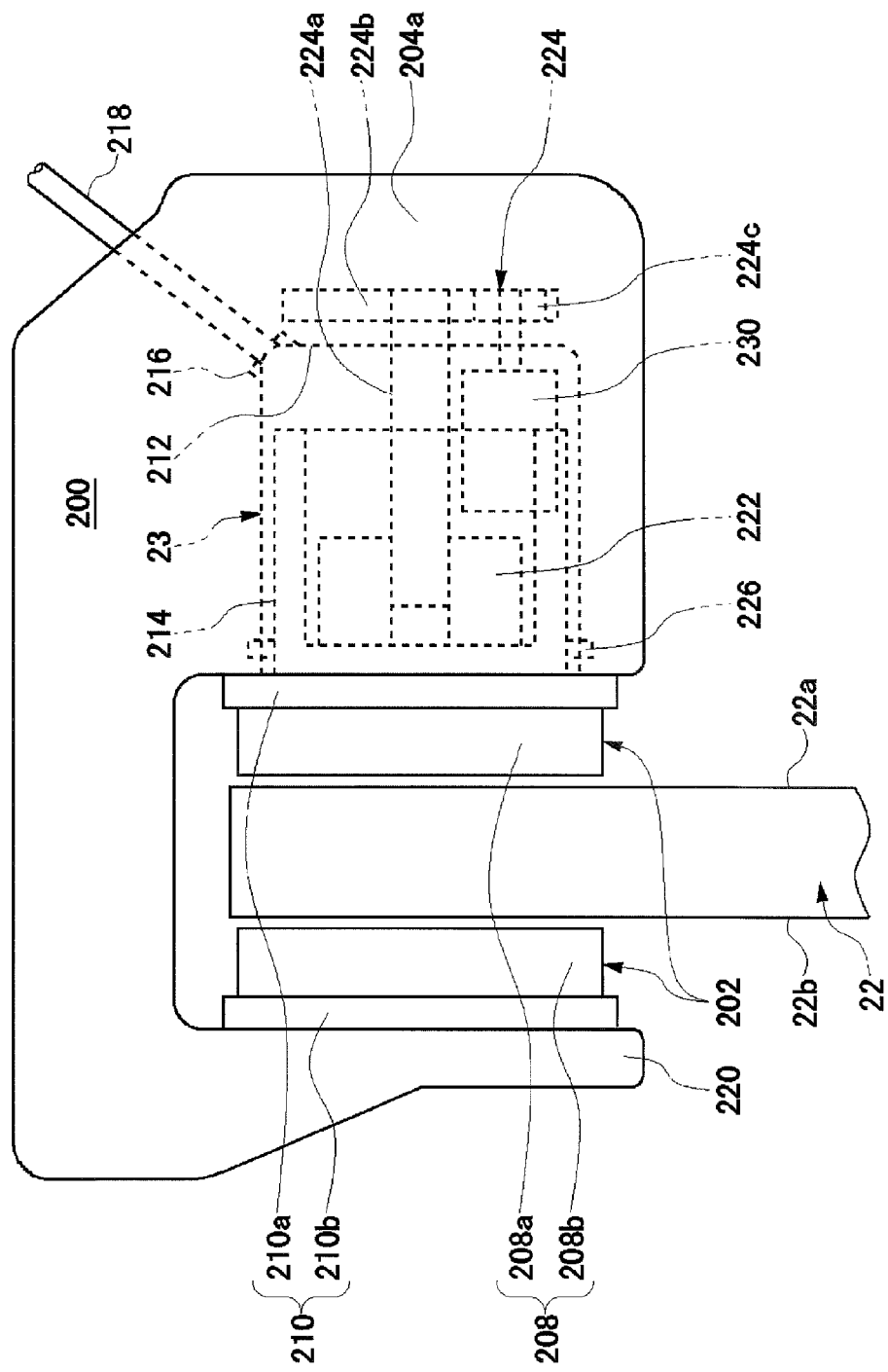
FIG. 2 is a schematic configuration diagram for describing the internal configuration of a built-in caliper according to the embodiment.

FIG. 2 is a schematic configuration diagram for describing the internal configuration of a built-in type caliper 200 according to the embodiment. The caliper 200 is provided to each of the rear wheel disk brake units 21RR and 21RL.

The caliper 200 is mounted on a vehicle body fixed mount (not shown), and includes a brake pad 202 which is to be pressed by the disk rotor 22 so as to generate a braking force, a piston 214 and a wheel cylinder 23 configured to press the brake pad 202. The disk rotor 22 configured to rotate together with the wheel has side faces 22a and 22b each configured as a friction face. A pair of brake pads 202 are arranged such that the disk rotor 22 is interposed between the brake pads 202. Each brake pad 202 includes a friction member 208 which is directly pressed into contact with the side face 22a or 22b of the disk rotor 22, and a pad metal base 210 which supports the back face of the friction member 208, i.e., the face on the side which is not pressed into contact with the disk rotor 22.

A cylinder housing 204a is provided with a cavity 212 having a bottom. Furthermore, the wheel cylinder 23 is formed in the cavity 212, and the piston 214 is inserted such that it can be slid. A port 216 is provided to the bottom of the cavity 212 such that it is connected to the hydraulic circuit via a hydraulic pipe 218. When the driver operates the brake pedal 24, the flow of the brake fluid is supplied to the port 216, thereby driving the piston 214.

First, description will be made regarding a case in which the caliper 200 functions as a regular braking unit which is driven by the hydraulic braking apparatus. When the flow of the brake fluid is supplied to the port 216, the piston 214 is slid from a non-operating position shown in FIG. 2 to a position at which the piston 214 is pressed into contact with the pad metal base 210a. In this state, the piston 214 presses the friction member 208a into contact with the side face 22a of the disk rotor 22 via the pad metal base 210a. As the flow of the brake fluid supplied to the port 216 becomes greater, the hydraulic pressure in the wheel cylinder 23 becomes greater. A tab portion 220 is provided to the cylinder housing 204a on the side where the cylinder is not formed. With such an arrangement, the tab portion 220 presses the friction member 208b into contact with the side face 22b of the disk rotor 22 via the pad metal base 210b. Thus, such an arrangement allows the disk rotor 22 to be pressed into contact with the pair of the friction members 208a and 208b such that it is interposed between the friction members 208a and 208b. This generates a regular braking force which is applied to the disk rotor 22 with high efficiency.

Next, description will be made regarding a case in which the caliper 200 functions as a parking braking unit which is driven by the parking brake apparatus. The piston 214 is configured to have a cup-shaped cross-section, for example. A nut member 222 is provided in the cup structure of the piston 214. The nut member 222 is screwed in with a threaded rod member 224a that forms a screw mechanism 224. By rotating the threaded rod member 224a, such a screw mechanism 224 allows forward and backward displacement of the nut member 222. The threaded rod member 224a is arranged such that its one end protrudes from the bottom of the wheel cylinder 23 and is connected to a reduction gear 224b arranged within the cylinder housing 204a. The reduction gear 224b is screwed with a driving gear 224c fixed to an output shaft of an electric motor 230. Thus, when the electric motor 230 is rotationally driven, the rotational speed of the electric motor 230 is reduced with a reduction ratio which is determined by a gear ratio between the driving gear 224c, the reduction gear 224b, the threaded rod member 224a, and the nut member 222. Such an arrangement allows forward and backward displacement of the nut member 222, along the axial direction of the threaded rod member 224a at a speed and displacement according to the driving operation of the electric motor 230. Description will be made below with the rotation of the electric motor 230 which displaces the nut member 222 toward the disk rotor 22 as "positive rotation". Conversely, the rotation of the electric motor 230 which displaces the nut member 222 toward the opposite side of the disk rotor 22 will be referred to as "negative rotation".

The screw mechanism 224 and the electric motor 230 form the parking brake apparatus. When the driver turns on a parking switch (not shown), the brake ECU 70 receives operation start information with respect to the parking brake apparatus. In this state, electric current is supplied to the electric motor 230 so as to rotationally drive the electric motor 230 in the positive rotation direction, thereby operating the parking brake. On the other hand, when the driver turns off the parking switch, the brake ECU 70 receives the operation release information with respect to the parking brake apparatus, and electric current is supplied to the electric motor 230 such that it is rotationally driven in the negative rotation direction, thereby releasing the parking brake.

A suitable sealing structure is provided to a portion of the bottom of the wheel cylinder 23 from which the threaded rod member 224a protrudes. The sealing structure prevents the brake fluid within the wheel cylinder 23 from leaking out. In the same way, a ring-shaped sealing member 226 is arranged between the wheel cylinder 23 and the piston 214, thereby providing a sealing structure which prevents the brake fluid from leaking out. The sealing member 226 also has a function of generating a force applied to the piston 214 in a direction in which the brake is released when the pressing force applied to the piston 214 by the brake fluid or the nut member 222 is released.

As described above, with the brake apparatus 20, the piston 214 arranged in the wheel cylinder 23 is shared by the hydraulic braking apparatus and the parking brake apparatus. Description will be made below regarding a high-efficiency method for controlling the hydraulic braking apparatus and the parking brake apparatus included in the brake apparatus 20 according to the present embodiment.

Figure 3:
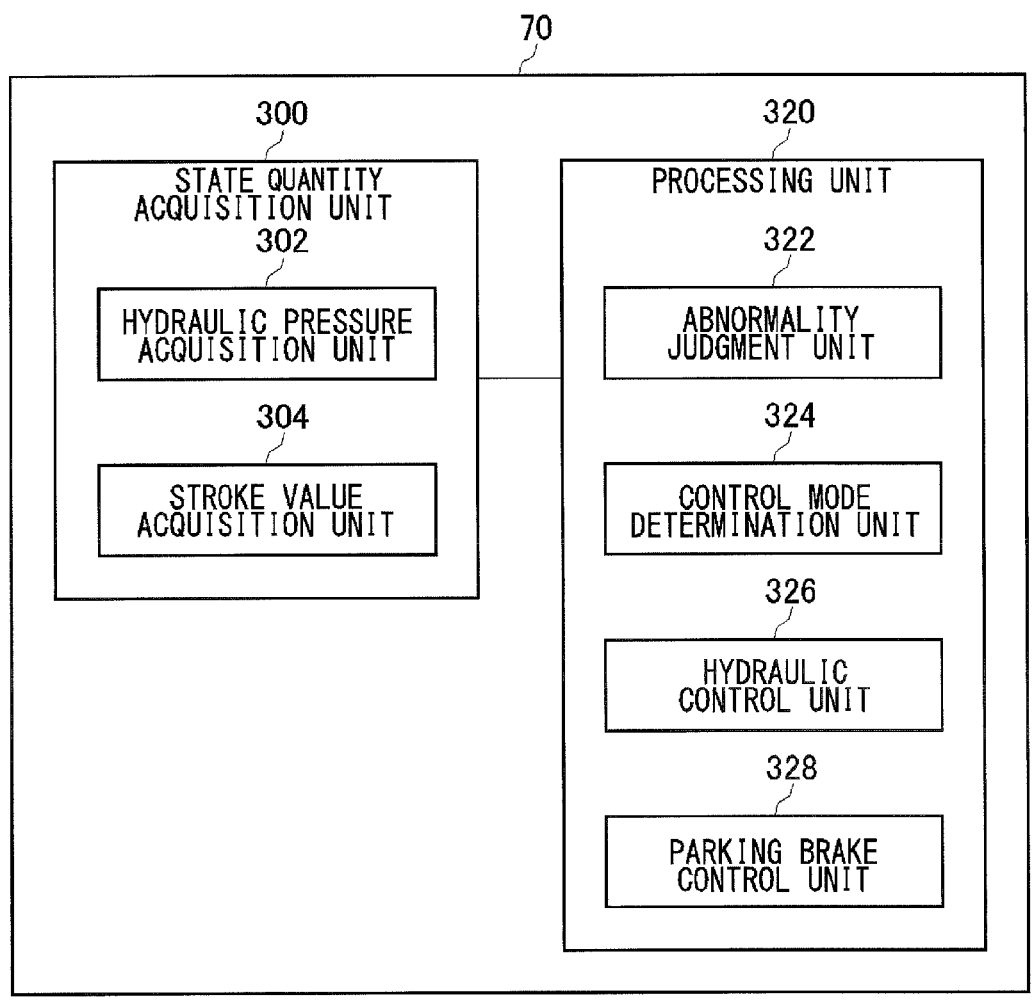
FIG. 3 is a functional block diagram showing a brake ECU.

FIG. 3 shows a functional block of the brake ECU 70. The brake ECU 70 includes a state quantity acquisition unit 300 and a processing unit 320. The state quantity acquisition unit 300 acquires the state values of the brake apparatus 20. The state quantity acquisition unit 300 includes a hydraulic pressure acquisition unit 302 which acquires the detected value from the hydraulic pressure sensor, and a stroke value acquisition unit 304 which acquires the stroke value from the stroke sensor 25.

The processing unit 320 performs various kinds of processing and control operations in the brake apparatus 20. The processing unit 320 receives the state values acquired by the state quantity acquisition unit 300, and judges whether or not each state value satisfies a predetermined judgment condition. The state quantity acquisition unit 300 acquires the state values from the first driving source. When judgment has been made that a state value does not satisfy a predetermined judgment condition, the processing unit 320 judges that a particular state has occurred. Examples of such a particular state include: a state in which an abnormality has occurred in the brake apparatus 20; a state in which the ABS control operation is to be suspended; a state in which the brake assist operation is to be executed; and the like. When the processing unit 320 detects that the second driving source starts to operate during operation of the first driving source, the processing unit 320 switches the judgment processing in which judgment is made using a predetermined judgment condition. In this case, the processing unit 320 may suspend the judgment processing in which judgment is made using the predetermined judgment condition. Also, in this case, the processing unit 320 may switch the judgment condition, and may execute the judgment processing using the judgment condition thus switched. The processing unit 320 includes an abnormality judgment unit 322, a control mode determination unit 324, a hydraulic control unit 326, and a parking brake control unit 328.

When a state value acquired by the state quantity acquisition unit 300 deviates from the normal range, the abnormality judgment unit 322 judges that an abnormality has occurred in the brake apparatus 20. Specifically, when there is not a proper relation between the hydraulic pressure acquired by the hydraulic pressure acquisition unit 302 and the stroke value of the brake pedal 24 acquired by the stroke value acquisition unit 304, the abnormality judgment unit 322 judges that an abnormality has occurred in the brake apparatus 20.

Figure 4:
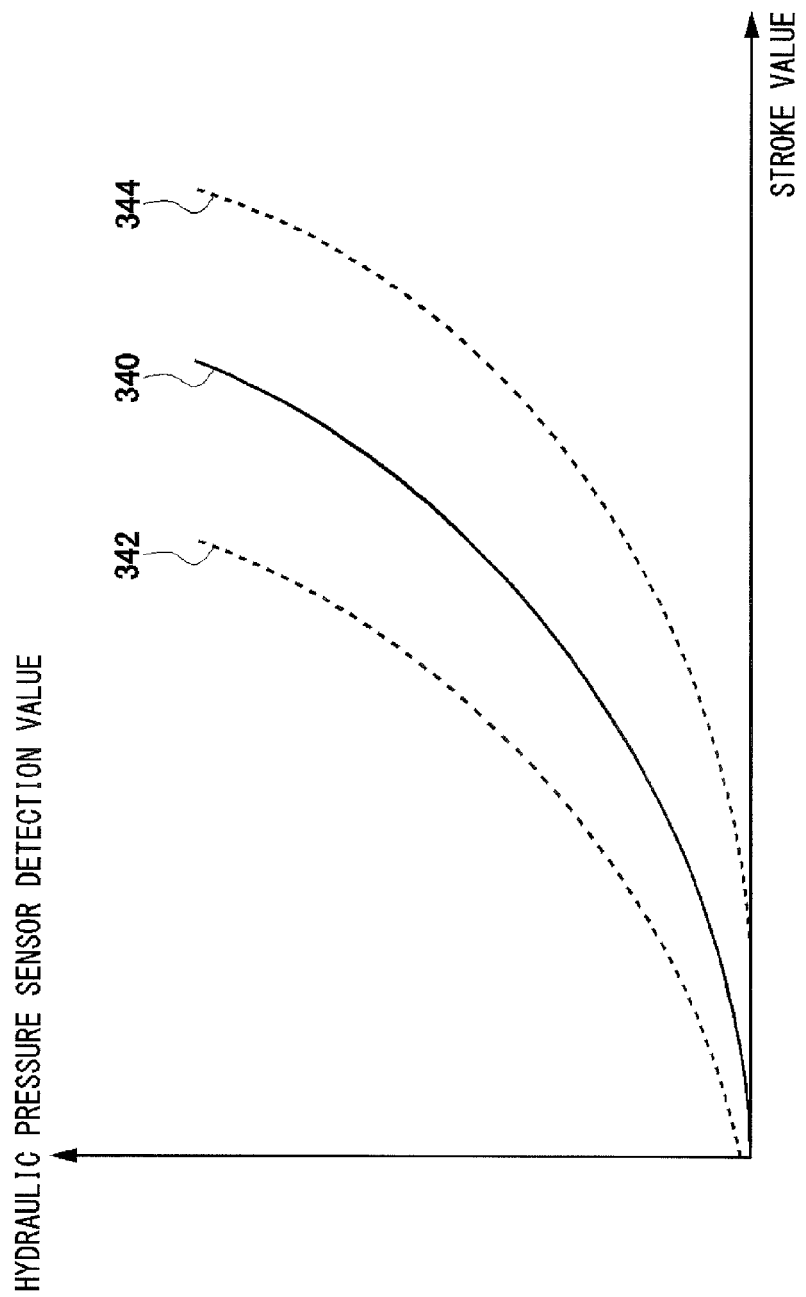
FIG. 4 is a diagram showing the relation between the stroke value of a brake pedal and the detection value detected by a hydraulic pressure sensor.

FIG. 4 shows the relation between the stroke value of the brake pedal 24 and the detection value acquired by the hydraulic pressure sensor. The vertical axis represents the output of the hydraulic pressure sensor, and the horizontal axis represents the output of the stroke sensor 25. When the brake apparatus 20 operates in the linear control mode, the isolation valve 60 is opened such that the first flow path 45a and the second flow path 45b of the main flow path 45 communicate with each other. In this state, the ABS holding valves 51 through 54 are each opened, and the ABS pressure reducing valves 56 through 59 are each closed. Thus, the control pressure sensor 73 detects the wheel cylinder pressure. On the other hand, when the brake apparatus 20 operates in the hydraulic booster mode, the booster linear control valve 66 and the pressure reducing linear control valve 67 are each closed, and the master cut valve 64 is set to the open state. In this state, the control pressure sensor 73 detects the hydraulic pressure in the master cylinder 32. Description will be made assuming that the vertical axis represents the output of the control pressure sensor 73. In a case in which another kind of hydraulic pressure sensor is provided to the hydraulic circuit, the vertical axis may represent the sensor output of the hydraulic pressure sensor thus provided.

In FIG. 4, the solid line 340 represents the standard value of the relation between the stroke value and the hydraulic sensor detection value. The broken line 342 represents the upper limit of the relation between the stroke value and the hydraulic pressure sensor detection value. The broken line 344 represents the lower limit of the relation between the stroke value and the hydraulic sensor detection value. Specificity, the broken lines 342 and 344 respectively represent the lower limit and the lower limit due to variation in the output characteristics of the stroke sensor 25 or the control pressure sensor 73. In normal operation, the points that represent the stroke value and the hydraulic pressure sensor detection value are plotted in a range defined between the broken lines 342 and 344. The relation shown in FIG. 4 is used as a map to judge whether or not the relation between the stroke value and the hydraulic pressure sensor detection value is within the normal range.

When the relation between the output value of the stroke sensor 25 and the output value of the control pressure sensor 73 is within a range between the broken lines 342 and 344, the abnormality judgment unit 322 judges that the output value of the stroke sensor 25 and the output value of the control pressure sensor 73 satisfy the normal relation. Conversely, when the relation between the output value of the stroke sensor 25 and the output value of the control pressure sensor 73 deviates from the range between the broken lines 342 and 344, the abnormality judgment unit 322 judges that an abnormality has occurred in the brake apparatus 20. Based on the judgment result, such an arrangement is capable of inferring a potential abnormality, examples of which include: a case in which an abnormality has occurred in the hydraulic pressure sensor (control pressure sensor 73); a case in which an abnormality has occurred in the stroke sensor 25; and a case in which a leak has occurred in the hydraulic circuit. When the abnormality judgment unit 322 judges that an abnormality has occurred, the abnormality judgment unit 322 transmits a notice of the occurrence of the abnormality to the control mode determination unit 324. In this case, the control mode determination unit 324 switches the control mode from the linear control mode to the hydraulic booster mode such that the hydraulic pressure is directly supplied from the master cylinder unit 27 to each wheel cylinder 23. The above is an ordinary abnormality judgment operation performed by the abnormality judgment unit 322.

Figure 5A:
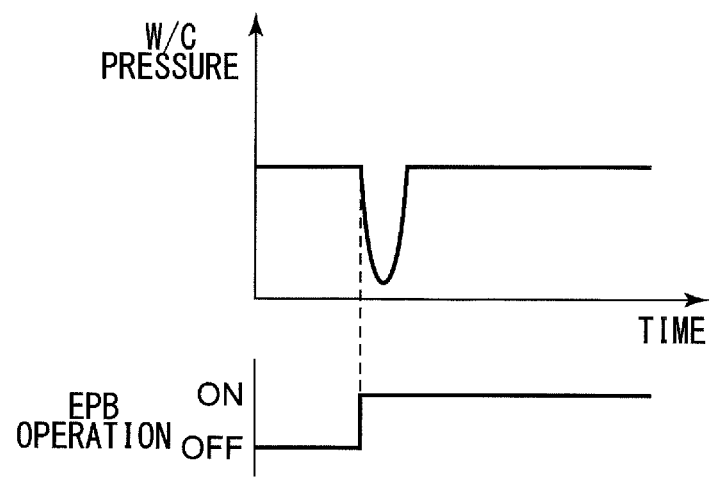
FIG. 5A is a diagram showing the change in the wheel cylinder pressure when the electric-powered parking brake (EPB) is operated from being in the released state.
Figure 5B:
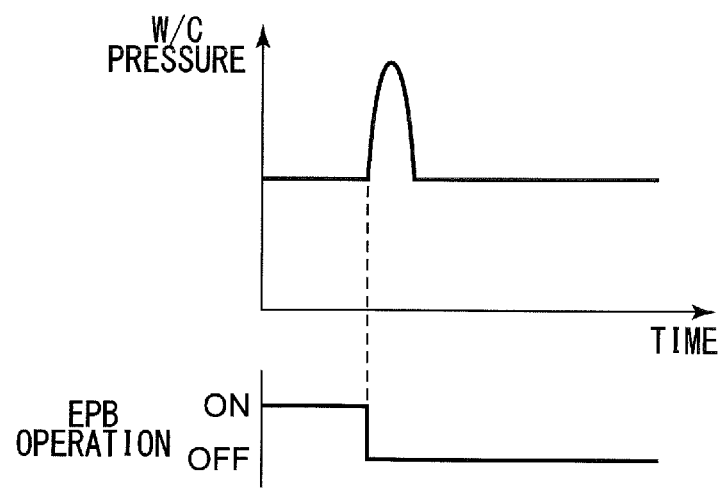
FIG. 5B is a diagram showing the change in the wheel cylinder pressure when the electric-powered parking brake (EPB) is released from being in the operated state.

FIG. 5A is a diagram showing the change in the wheel cylinder pressure in a case in which the electric parking brake (EPB) apparatus is operated from being in the released state. FIG. 5B is a diagram showing the change in the wheel cylinder pressure in a case in which the electric parking brake (EPB) apparatus is released from being in the operated state.

With the brake apparatus 20, the parking brake apparatus is controlled by the parking brake control unit 328. Specifically, when the driver turns on the parking switch, the parking brake control unit 328 receives the result of this operation as the operation start information with respect to the parking brake apparatus, and supplies electric current to the electric motor 230 (see FIG. 2) so as to rotationally drive the electric motor 230 in the positive rotation direction. By driving the electric motor 230, the nut member 222 is rotated together with the threaded rod member 224a so as to push out the piston 214 toward the disk rotor 22 side. This leads to an increase in the fluid filling capacity of the wheel cylinder 23 regardless of the operation value of the brake pedal 24.

With the brake apparatus 20 according to the present embodiment, the piston 214 is shared by the hydraulic braking apparatus and the parking brake apparatus. Thus, when the parking brake apparatus starts to operate, in some cases, there is a drop in the detection value of the wheel cylinder pressure (W/C pressure) detected by the control pressure sensor 73. It should be noted that, in the hydraulic booster mode, when the parking brake starts to operate in a situation which in the brake pedal 24 is operated, in some cases, there is a drop in the detection value of the wheel cylinder pressure detected by the control pressure sensor 73.

Conversely, when the driver turns off the parking switch in a state in which the parking brake apparatus is operating, the parking brake control unit 328 receives the result of this operation as the operation release information with respect to the parking brake apparatus, and supplies current to the electric motor 230 such that it is rotationally driven in the negative rotation direction. In this state, the electric motor 230 is rotationally driven in the reverse rotation direction to when the parking brake apparatus starts to operate. In this state, the nut member 222 is rotated together with the threaded rod member 224a such that the distance between the piston 214 and the disk rotor 22 side increases. This leads to a reduction in the fluid filling capacity of the wheel cylinder 23 regardless of the operation value of the brake pedal 24. In some cases, this leads to a rise in the detection value of the wheel cylinder pressure (W/C pressure) detected by the control pressure sensor 73, as shown in FIG. 5B.

Description will be separately made below regarding the principles in a case in which the control mode is set to the linear control mode and a case in which the control mode is set to the hydraulic booster mode.

In the linear control mode, the isolation valve 60 is opened such that the first flow path 45a and the second flow path 45b of the main flow path 45 communicate with each other. Furthermore, the ABS holding valves 51 through 54 are each opened, and the ABS pressure reducing valves 56 through 59 are each closed. When the driver turns on the parking switch, the piston 214 is driven such that it is pushed out toward the disk rotor 22 side. This leads to a reduction in the detection value of the control pressure sensor 73 regardless of whether or not the driver depresses the brake pedal 24. Conversely, when the driver turns off the parking switch in a state in which the parking brake apparatus is operating, the piston 214 is driven such that it retracts from the disk rotor 22 side. This leads to an increase in the detection value detected by the control pressure sensor 73.

Figure 6:
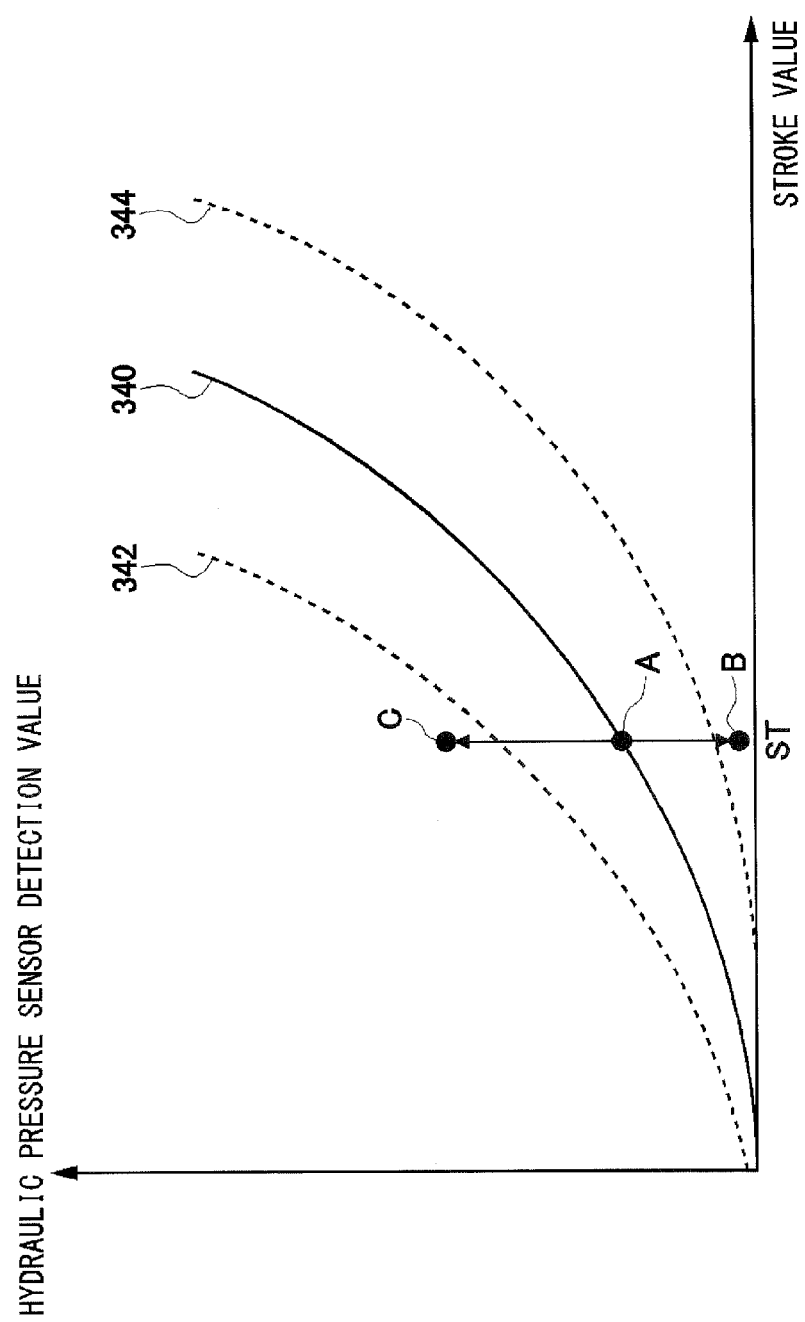
FIG. 6 is a diagram showing the relation between the stroke value of the brake pedal and the detection value detected by the hydraulic pressure sensor.

FIG. 6 shows the relation between the stroke value of the brake pedal 24 and the detection value detected by the hydraulic pressure sensor. In FIG. 6, the point A represents the standard value of the sensor detection value when the stroke value is ST. When the detection value detected by the control pressure sensor 73 is higher than the lower limit represented by the broken line 344 after the parking switch is turned on, the abnormality judgment unit 322 judges that the sensor detection value is within a normal range. On the other hand, when the detection value detected by the control pressure sensor 73 becomes lower than the lower limit (point B), the abnormality judgment unit 322 judges that an abnormality has occurred. In the same way, when the detection value detected by the control pressure sensor 73 is lower than the lower limit represented by the broken line 342 after the parking switch is turned off, the abnormality judgment unit 322 judges that the sensor detection value is within a normal range. However, when the detection value detected by the control pressure sensor 73 becomes higher than the lower limit (point C), the abnormality judgment unit 322 judges that an abnormality has occurred.

In the linear control mode, the brake ECU 70 controls the hydraulic pressure according to the stroke value of the brake pedal 24. Specifically, when the hydraulic pressure is low as compared with the stroke value, the brake ECU 70 performs a booster control operation, i.e., opens the booster linear control valve 66 so as to supply the brake fluid from the powered hydraulic pressure source 30. This solves such a problem of an abnormal drop in the hydraulic pressure. In this stage, the detection value detected by the control pressure sensor 73 becomes a value within a normal range. Conversely, when the hydraulic pressure is higher as compared with the stroke value, the brake ECU 70 performs a pressure reducing control operation, i.e., opens the pressure reducing linear control valve 67 such that the brake fluid escapes from the hydraulic circuit. Such an arrangement solves such a problem of an abnormal rise of the hydraulic pressure. In this stage, the detection value detected by the control pressure sensor 73 becomes a value within a normal range. As described above, in a short period of time after the parking brake is operated or released, the abnormality judgment unit 322 judges that an abnormality has occurred. Subsequently, the brake ECU 70 restores the relation between the stroke value and the hydraulic pressure, and the abnormality judgment unit 322 then judges that the relation between the stroke value and the hydraulic pressure is within a normal range. Such an autonomous hydraulic control operation is executed by the hydraulic control unit 326.

In the hydraulic booster mode, the master cut valve 64 and the regulator cut valve 65 are each opened, and the isolation valve 60 and the simulator cut valve 68 are each closed. When the brake pedal 24 is not depressed, the master cylinder 32 communicates with the reservoir 34. Thus, when the brake pedal 24 is not depressed, there is no change in the detection value of the hydraulic pressure sensor regardless of whether the parking brake apparatus is operated or released. In contrast, when the brake pedal 24 has been depressed, this shuts off the communication between the master cylinder 32 and the reservoir 34. Thus, when the driver turns on the parking switch in a state in which the brake pedal 24 has been depressed, the piston 214 is driven such that it is pushed out toward the disk rotor 22 side. This leads to a reduction in the detection value of the control pressure sensor 73. Conversely, when the driver turns off the parking switch in a state in which the brake pedal 24 has been depressed, and the parking brake apparatus has been operated, the piston 214 is driven such that it is retracted from the disk rotor 22 side. This leads to an increase in the detection value of the control pressure sensor 73. Thus, as shown in FIG. 6, in the hydraulic booster mode, in some cases, the relation between the stroke value of the brake pedal 24 and the detection value of the hydraulic pressure sensor deviates from a normal range.

In the hydraulic booster mode, when the hydraulic pressure is low as compared with the stroke value, by drawing in the brake pedal 24, such an arrangement is capable of compensating for the shortage of the brake fluid. This solves such a problem of an abnormal drop in the hydraulic pressure. In this stage, the detection value of the control pressure sensor 73 becomes a value within a normal range. Conversely, when the hydraulic pressure is high as compared with the stroke value, the surplus of brake fluid is absorbed by pushing up the brake pedal 24. This solves such a problem of an abnormal rise in the hydraulic pressure. In this stage, the detection value of the control pressure sensor 73 becomes a value within a normal range. As described above, in a short period of time after the parking brake is operated or released, the abnormality judgment unit 322 judges that an abnormality has occurred. Subsequently, the brake pedal 24 is displaced so as to restore the relation between the stroke value and the hydraulic pressure, and the abnormality judgment unit 322 then judges that the relation between the stroke value and the hydraulic pressure is within a normal range.

As described above, in both the linear control mode using the powered hydraulic pressure source 30 and the hydraulic booster mode using the master cylinder unit 27, in a short period of time after the parking brake is operated or released, in some cases, the abnormality judgment unit 322 judges that an abnormality has occurred. However, the detection of such an abnormality is a false detection due to the parking brake being operated or released. Thus, such a false detection should be distinguished from an abnormality to be detected.

In order to solve such a problem, with the present embodiment, various kinds of control operations are performed so as to reduce the risk of false detection of an abnormality when the parking brake is operated or released. By employing such control operations, such an arrangement suppresses unnecessary control operations performed according to a false detection of an abnormality. This reduces the frequency of operation of the apparatus. Thus, such an arrangement improves the life of each component, and reduces operating noise that occurs in the apparatus or its components.

The brake apparatus 20 according to the present embodiment includes: the piston 214 configured as a displacement member which is displaced with respect to the disk rotor 22; the brake pad 202 configured as a friction member which is pressed by the piston 214 thus displaced so as to press the disk rotor 22, thereby generating a braking force; the hydraulic braking apparatus which displaces the piston 214 using the hydraulic pressure; a parking brake apparatus configured as an electric braking apparatus which displaces the piston 214 using a force that differs from the hydraulic pressure; and a brake ECU 70 configured as a control unit which controls the hydraulic braking apparatus based on the information acquired from the control pressure sensor 73 configured as a detection unit which detects the information that has a correlation with the hydraulic pressure applied to the piston 214.

The hydraulic braking apparatus according to the present embodiment is configured including the master cylinder unit 27, the powered hydraulic pressure source 30, the hydraulic actuator 40, and the like. When the parking brake apparatus operates in a state in which braking is being performed by means of the hydraulic braking apparatus, the brake ECU 70 controls the hydraulic braking apparatus or otherwise the parking brake apparatus so as to suppress fluctuation of the hydraulic pressure.

As described above, when the parking brake apparatus operates in a state in which braking is being performed by means of the hydraulic braking apparatus, in some cases, this leads to a change in the hydraulic pressure due to the displacement of the piston 214. This leads to false detection in the brake ECU 70. In this case, even if the driver has no intention to change the braking force, the hydraulic braking apparatus is controlled so as to compensate for the fluctuation of the hydraulic pressure. That is to say, an originally unnecessary braking control operation is executed.

However, when the parking brake apparatus is operated in a state in which braking is being performed by means of the hydraulic braking apparatus, the brake apparatus 20 is configured to be capable of suppressing fluctuation of the hydraulic pressure. That is to say, if no control operation is performed for suppressing fluctuation of the hydraulic pressure due to the operation of the parking brake apparatus, in some cases, the detection value detected by the control pressure sensor 73 becomes higher than the broken line 342, or otherwise becomes lower than the broken line 344, as shown in FIG. 6; but by suppressing fluctuation of the hydraulic pressure, there is a high probability that the relation between the output value of the stroke sensor 25 and the output value of the control pressure sensor 73 will be maintained in a range between the broken lines 342 and 344. As a result, the abnormality judgment unit 322 judges that the relation between the output value of the stroke sensor 25 and the output value of the control pressure sensor 73 is within a normal range. Thus, such an arrangement suppresses the unnecessary execution or switching of braking control operations due to false detection.

As a method for suppressing fluctuation of the hydraulic pressure due to the operation of the parking brake apparatus as described above, the responsiveness of the hydraulic braking apparatus, which operates so as to cancel out the fluctuation of the hydraulic pressure due to the operation of the parking brake apparatus, may preferably be raised. That is to say, when the brake ECU 70 receives the operation start information with respect to the parking brake apparatus in a state in which braking is being performed by means of the hydraulic braking apparatus, the control operation of the hydraulic braking apparatus is switched so as to raise the responsiveness of the operation of the hydraulic braking apparatus to a higher level. This allows the fluctuation of the hydraulic pressure to be suppressed in an early stage when the parking brake apparatus is operated in a state in which braking is being performed by means of the hydraulic braking apparatus.

[Dead-Band Region Width Adjustment]

Figure 7:
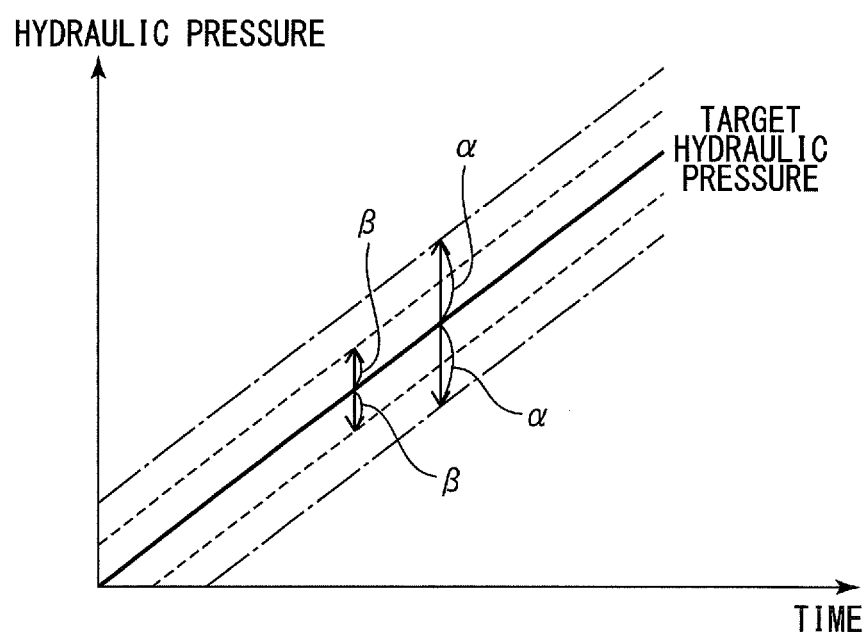
FIG. 7 is a diagram for describing the relation between the target hydraulic pressure and the dead-band region.

As a method for raising the responsiveness of the operation of the hydraulic braking apparatus, the width of a dead-band region may be narrowed. FIG. 7 is a diagram for describing the relation between the target hydraulic pressure and the dead-band region.

The term "dead-band region" represents a range having a predetermined width set for the target hydraulic pressure (the "dead-band width" represents the predetermined width of the "dead-band region"). In the feedback control operation for the hydraulic pressure, when the actual hydraulic pressure is within the dead-band region, judgment is made that the actual hydraulic pressure matches the target hydraulic pressure. By setting the dead-band region for the target hydraulic pressure, such an arrangement is capable of suppressing the occurrence of hunting in the hydraulic pressure control operation, as compared with an arrangement in which the target hydraulic pressure is configured as a single pressure point.

FIG. 7 shows the target hydraulic pressure (solid line) and the dead-band region (region enclosed by line of dashes and dots) set in the normal hydraulic pressure control operation. The horizontal axis in the drawing represents the passage of time. The actual hydraulic pressure, which represents the hydraulic pressure in actuality, is controlled such that it is within a dead-band region having a width of ±α [MPa] with the target hydraulic pressure as the center value.

The brake apparatus 20 according to the present embodiment includes the control pressure sensor 73 as a detection unit which detects the information having a correlation with the hydraulic pressure applied to the piston 214. In a state in which the parking brake apparatus is not operating, the hydraulic control unit 326 controls the hydraulic braking apparatus based on the output value of the control pressure sensor 73 using as a reference value the target hydraulic pressure with the dead-band region having a first width.

Figure 8:
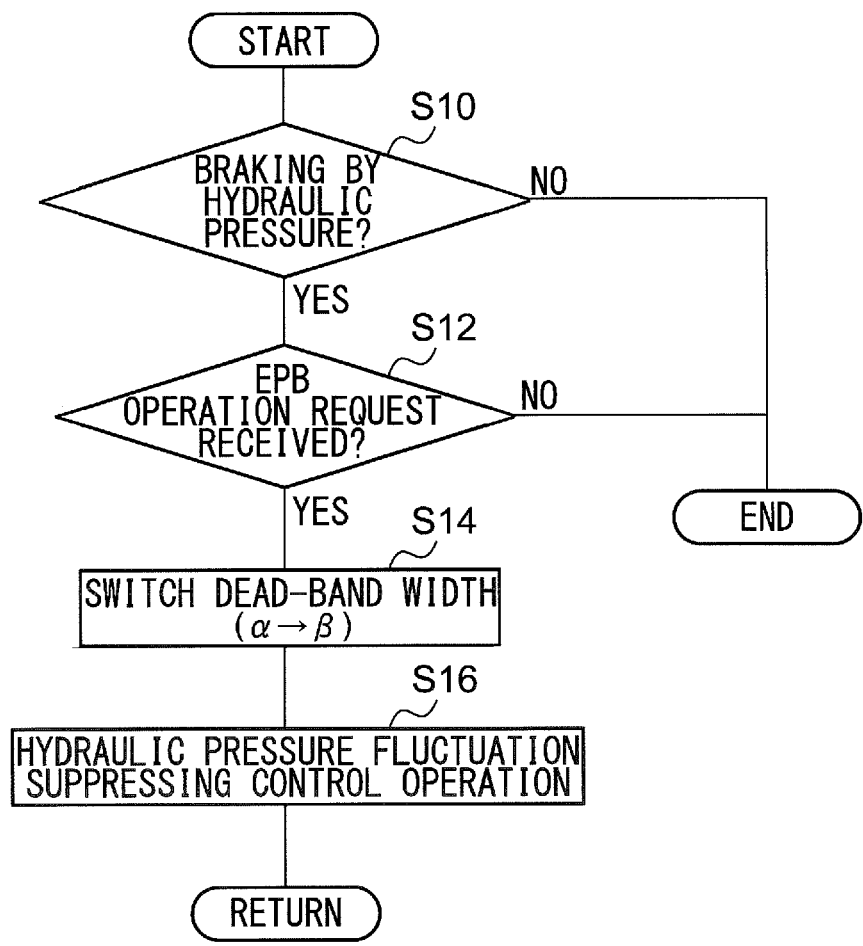
FIG. 8 is a flowchart showing an example of the control operation of the brake apparatus according to the present embodiment.

FIG. 8 is a flowchart showing an example of the control operation of the brake apparatus according to the present embodiment. First, the brake ECU 70 acquires, from the state quantity acquisition unit 300, the state value for the brake apparatus 20, and judges whether or not the brake apparatus 20 is performing a hydraulic braking operation (S10). When judgment is made that the brake apparatus 20 is not in the process of hydraulic braking (NO in S10), the brake ECU 70 suspends the operation. Conversely, when judgment is made that the brake apparatus 20 is in the process of hydraulic braking (YES in S10), the brake ECU 70 judges whether or not a request to operate the parking brake apparatus (EPB) has been received (S12). When judgment is made that such a request to operate the parking brake apparatus (EPB) has not been received (NO in S12), the ECU 70 suspends the operation.

When the brake ECU 70 acquires the operation start information with respect to the parking brake apparatus (ON/OFF operation signal input via the parking switch) in a state in which braking is being performed by means of the hydraulic braking apparatus (YES in S12), the brake ECU 70 switches the dead-band width from α to β, which is smaller than α (S14). Subsequently, the hydraulic control unit 326 performs a hydraulic pressure fluctuation suppressing control operation based on the output value of the control pressure sensor 73 using as a reference value the target hydraulic pressure with a dead-band region having the second width (β) which is smaller than the first width (α) (S16). Here, the second width is represented by the range enclosed by the dotted lines shown in FIG. 7. The second width is configured as the dead-band width having a width of ±β [MPa] (β<α) with the target hydraulic pressure as the center value.

As described above, when the parking brake apparatus operation start information is acquired in a state in which braking is being performed by means of the hydraulic braking apparatus, the hydraulic control unit 326 sets the dead-band width to a value that is smaller than the normal state value, thereby raising the responsiveness of the hydraulic pressure control operation. This allows the fluctuation of the hydraulic pressure that occurs due to the operation of the parking brake apparatus to be restored in an early stage. Such an arrangement is capable of reducing the maximum value of the fluctuation of the hydraulic pressure. As a result, such an arrangement reduces the risk of false detection of an abnormality. This suppresses unnecessary control operations. That is to say, this reduces the frequency of operation of the apparatus.

Thus, such an arrangement improves the life of each component, and reduces operating noise that occurs in the apparatus or its components.

[Supply of Electric Current to Control Valves]

Figure 9:
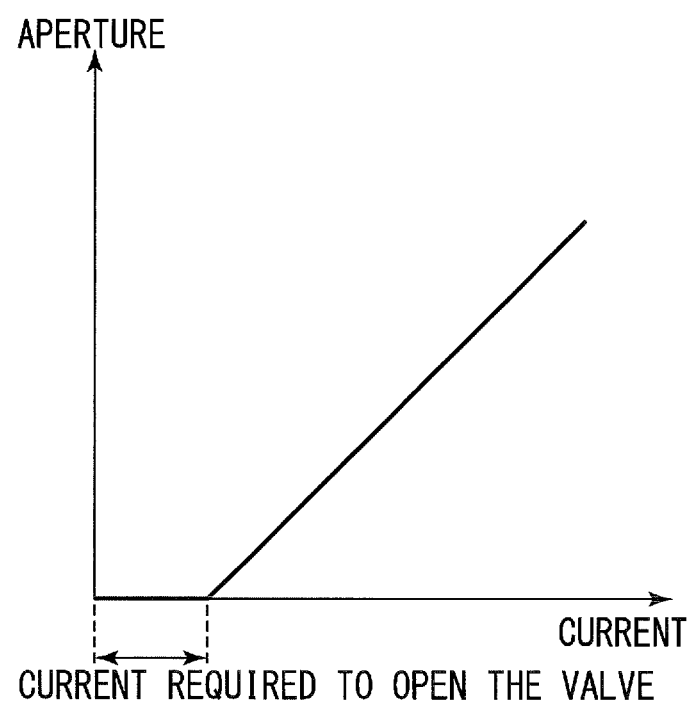
FIG. 9 is a diagram showing the relation between the electric current supplied to a booster linear control valve and its valve aperture and the relation between electric current supplied to a pressure reducing linear control valve and its valve aperture.

FIG. 9 is a diagram showing the relation between electric current supplied to the booster linear control valve and its valve aperture and the relation between electric current supplied to the pressure reducing linear control valve and its valve aperture.

As shown in FIG. 9, with the booster linear control valve 66 and the pressure reducing linear control valve 67 each configured as a normally-closed valve, when the current applied to such a valve is gradually increased from zero, such a linear control valve remains closed before the force generated at the solenoid exceeds the force applied by the spring. That is to say, when the current is applied so as to open the liner control valve from a state in which no current is applied, a time lag of a certain degree occurs before the valve opens.

Figure 10:
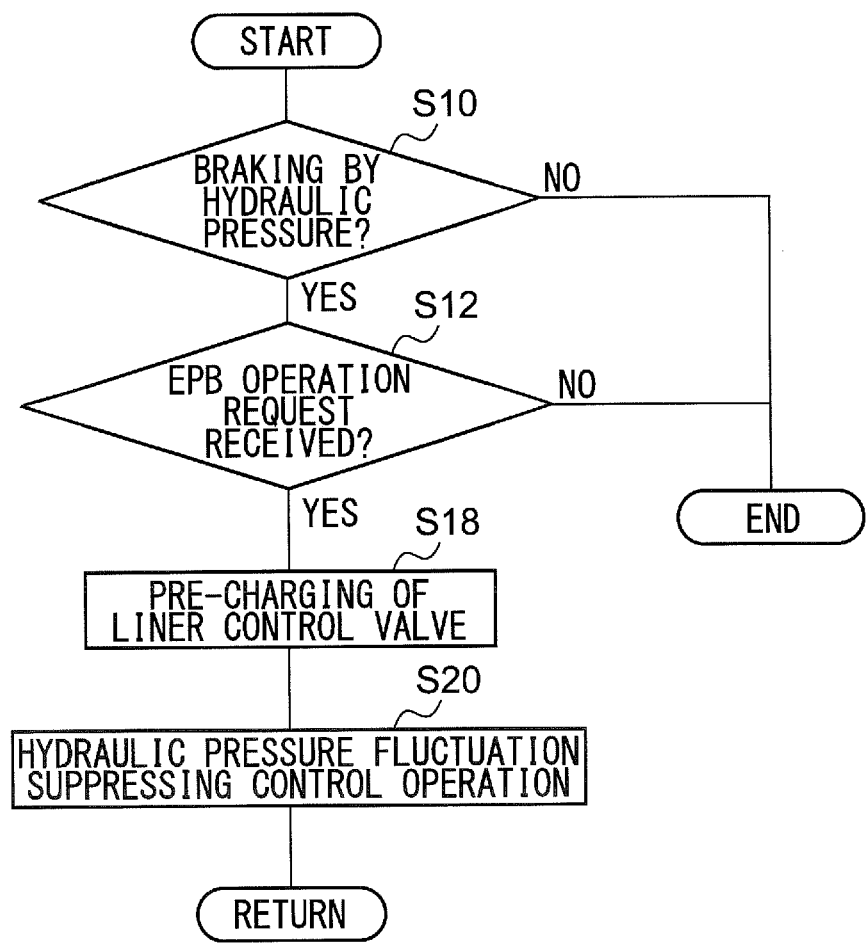
FIG. 10 is a flowchart showing an example of the brake apparatus according to the present embodiment.

FIG. 10 is a flowchart showing an example of the control operation of the brake apparatus according to the present embodiment. It should be noted that the same steps as those in the control operation shown in FIG. 8 are denoted by the same reference symbols, and description will be omitted as appropriate.

As described above, the brake apparatus 20 includes the booster linear control valve 66 and the pressure reducing linear control valve 67 each configured as an electromagnetic control valve which controls the flow of the brake fluid used to change the hydraulic pressure. With such an arrangement, as shown in FIG. 10, when the hydraulic control unit 326 acquires the parking brake apparatus operation start information in a state in which braking is being performed by means of the hydraulic braking apparatus (YES in S12), the hydraulic control unit 326 performs an electric current supply control operation (pre-charging) for each linear control valve so as to raise the responsiveness of each of the booster linear control valve 66 and the pressure reducing linear control valve 67 (S18). Here, the pre-charging represents a control operation in which electric current is supplied to each electromagnetic control valve beforehand at a current level that does not switch the open/close state of the electromagnetic control valve before the open/close control operation for the electromagnetic control valve. This allows the responsiveness of each electromagnetic control valve to be raised. In this state, the hydraulic control unit 326 executes the hydraulic pressure fluctuation suppressing control operation based on the output value of the control pressure sensor 73 using as a reference value the target hydraulic pressure provided with the dead-band region (S20).

This allows the time lag from an instruction to open each linear control valve up to the completion of the opening of each linear control valve to be reduced. Thus, such an arrangement suppresses fluctuation of the hydraulic pressure in an early stage when the parking brake apparatus operates in a state in which braking is being performed by means of the hydraulic braking apparatus.

Also, as a control operation for raising the responsiveness of the control valve, such an arrangement may employ an operation for temporarily raising the target hydraulic pressure.

For example, in a sate in which the parking brake apparatus is not operating, the hydraulic braking apparatus may be controlled based on the output value of the control pressure sensor 73 using a first target hydraulic pressure as a reference. On the other hand, when the parking brake apparatus operation start information is acquired in a state in which braking is being performed by means of the hydraulic braking apparatus, the hydraulic braking apparatus may be controlled based on the output value of the control pressure sensor 73 as a reference using a second target hydraulic pressure that is greater than the first target hydraulic pressure. With such an arrangement, the pressure difference between the output value of the control pressure sensor 73 and the target hydraulic pressure temporarily increases. This increases the flow of the brake fluid so as to compensate for the pressure difference, thereby raising the responsiveness of the operation of the hydraulic braking apparatus. Thus, such an arrangement is capable of suppressing fluctuation of the hydraulic pressure in an early stage when the electric-powered brake apparatus operates in a state in which braking is being performed by means of the hydraulic braking apparatus.

[Reduction of Clamping Force Applied to Parking Brake Apparatus]

As shown in FIGS. 5A and 5B, when the parking brake apparatus operates during hydraulic braking, the wheel cylinder pressure temporarily fluctuates. The fluctuation range of the wheel cylinder pressure is proportional to the amount of deformation of the brake pad 202. Thus, by reducing the amount of deformation of the brake pad 202, i.e., by reducing the force applied from the brake pad 202 to the disk rotor 22, such an arrangement is capable of reducing the temporal fluctuation of the wheel cylinder pressure.

Thus, when the parking brake control unit 328 acquires the parking brake apparatus operation start information in a state in which braking is being performed by means of the hydraulic braking apparatus, the parking brake control unit 328 switches the control operation so as to reduce a braking force (clamping force) generated by the parking brake apparatus, as compared with a normal state. Specifically, the parking brake control unit 328 reduces the amount of rotation of the electric motor 230 as compared with a normal state, thereby reducing the amount of displacement of the piston 214. This reduces the force applied from the brake pad 202 to the disk rotor 22, thereby reducing the fluctuation of the wheel cylinder pressure due to the operation of the parking brake apparatus. As a result, such an arrangement reduces the risk of false detection of an abnormality.

It should be noted that, with such an arrangement, although the braking force generated by the parking brake apparatus is reduced as compared with a normal state, braking force is also generated by the hydraulic braking apparatus. Thus, there is no problem in particular. More preferably, such a control operation may preferably be performed when the vehicle is on a flat level where the vehicle does not require the full braking force of the parking brake apparatus. Judgment is made whether or not the vehicle is on a flat level based on the information acquired from an acceleration sensor, for example.

The parking brake apparatus is not required to have high responsiveness, unlike the hydraulic braking apparatus. That is to say, there is room for time from the time point at which the driver operates the parking switch up to the time point at which the parking brake apparatus operates. Furthermore, even after the piston starts to move, the hydraulic pressure does not rise before the pad clearance becomes zero. Thus, the time lag from the time point at which the driver operates the parking switch up to the time point at which the hydraulic pressure in the parking brake apparatus starts to rise may be calculated by experiment or otherwise by simulation. With such an arrangement, based on the time lag thus calculated, the brake ECU 70 may instruct the hydraulic braking apparatus to perform a hydraulic pressure control operation before or otherwise at the same time as the operation of the parking brake apparatus giving consideration to the time lag.

[Adjustment of Gain of Electric Motor]

As described above, by actively raising the responsiveness of the hydraulic braking apparatus, such an arrangement is capable of compensating in an early stage for fluctuation of the hydraulic pressure that occurs when the parking brake apparatus operates. This reduces the risk of false detection of an abnormality. Also, conversely, by reducing the rate of fluctuation of the hydraulic pressure that occurs when the parking brake apparatus operates, such an arrangement is capable of reducing the range of fluctuation of the hydraulic pressure without particular adjustment of the control operation of the hydraulic braking apparatus.

Figure 11:
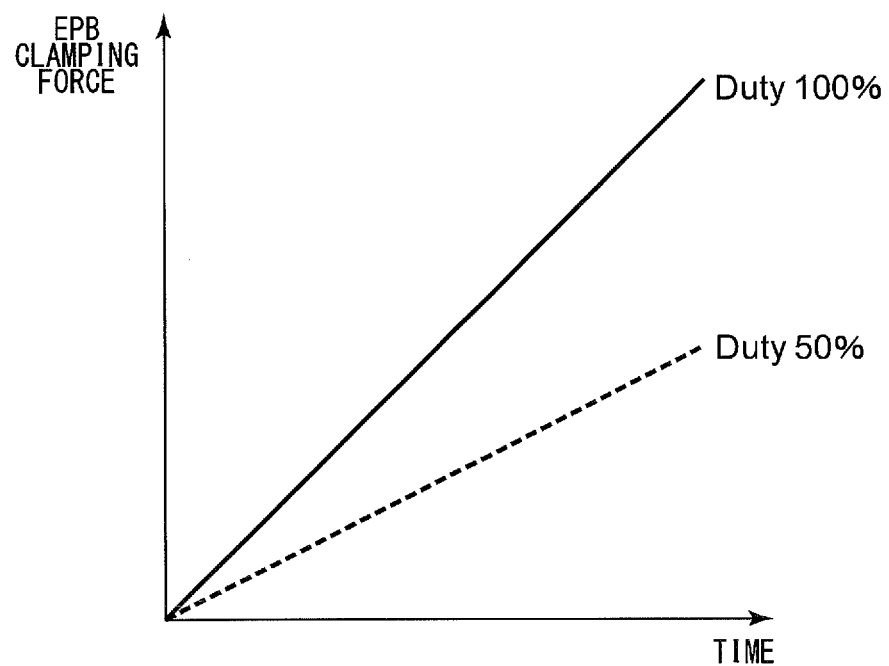
FIG. 11 is a diagram showing the relation between the operating time (responsiveness) of an electric motor included in a parking brake apparatus and the clamping force.

FIG. 11 is a diagram showing the relation between the operating time (responsiveness) of the electric motor and the clamping force for the parking brake apparatus. Of the two lines, the line having a greater slope represents a case in which the gain of the electric motor is relatively great (with a duty of 100% in a normal state). The other line having a smaller slope represents a case in which the gain of the electric motor is relatively small (with a duty of 50% in a hydraulic pressure suppressing control operation).

Figure 12:
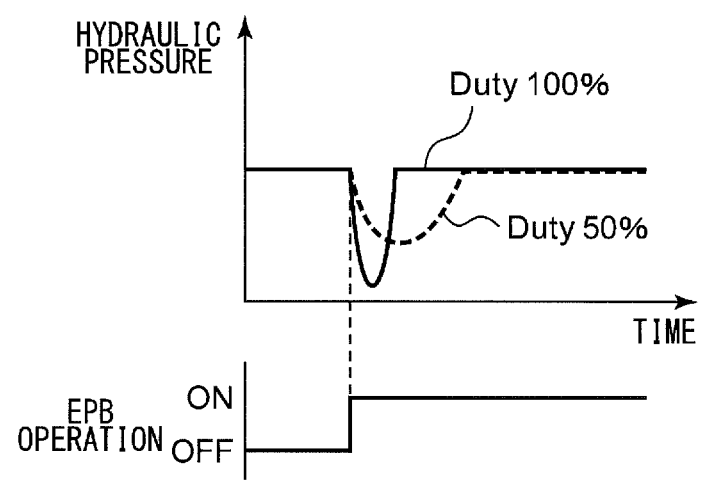
FIG. 12 is a diagram for describing the change in the liquid pressure before and after the parking brake apparatus operates.

FIG. 12 is a diagram for describing the fluctuation of the hydraulic pressure before and after the parking brake apparatus operates. The solid line represents the fluctuation of the hydraulic pressure when the electric motor operates with a duty of 100%. The dotted line represents the fluctuation of the hydraulic pressure when the electric motor operates with a duty of 50%.

As shown in FIG. 12, in a case in which the electric motor operates with a duty of 50% in a state in which braking is being performed by means of the hydraulic braking apparatus, this reduces the fluctuation of the hydraulic pressure, as compared with a case in which the electric motor operates with a duty of 100%. In addition, such an arrangement provides a reduced rate of fluctuation of the hydraulic pressure.

Thus, when the parking brake control unit 328 acquires the parking brake apparatus operation start information in a state in which braking is being performed by means of the hydraulic braking apparatus, the operation gain of the parking brake apparatus is switched to a smaller value. Such an arrangement is capable of reducing the rate of fluctuation of the hydraulic pressure even if the parking brake apparatus starts to operate in a state in which braking is being performed by means of the hydraulic braking apparatus. That is to say, such an arrangement allows the range of the hydraulic pressure fluctuation to be reduced without raising the responsiveness of the control operation of the hydraulic braking apparatus.

[Orifice]

Also, an orifice may be provided to the hydraulic circuit between the control pressure sensor 73 and the wheel cylinder 23 at which the hydraulic pressure fluctuation can occur as described above. This suppresses hydraulic pressure fluctuation at the control pressure sensor 73 even if the hydraulic pressure suddenly changes at the wheel cylinder 23 due to the operation of the parking brake apparatus. Thus, such an arrangement reduces false detections of abnormalities, and suppresses the execution of unnecessary braking control operations.

As described above, the brake apparatus 20 according to the present embodiment is capable of controlling the respective components, i.e., the master cylinder unit 27, the powered hydraulic pressure source 30, and the hydraulic actuator 40, such that the hydraulic braking apparatus is able to operate without being easily affected by the fluctuation of hydraulic pressure due to the operation of the parking brake.

[Second Embodiment]

Description will be made in the present embodiment mainly regarding a control operation for suppressing operating noise that can occur in an operation for compensating for hydraulic pressure fluctuation that occurs due to the operation of the parking brake apparatus or the like.

[Adjustment of Accumulation Start Pressure in Accumulator]

As described above, the brake apparatus 20 includes the powered hydraulic pressure source 30 which supplies the brake fluid to each wheel cylinder 23 which is provided with the piston 214. When the powered hydraulic pressure source 30 included in the hydraulic braking apparatus operates during operation of the parking brake apparatus, in some cases, this leads to a voltage drop due to inrush current and leads to an increase in operating noise.

In order to solve such a problem, the hydraulic control unit 326 controls the powered hydraulic pressure source 30 so as to suppress the operation of the powered hydraulic pressure source 30 during operation of the parking brake apparatus. This suppresses such a state in which the powered hydraulic pressure source 30 and the parking brake apparatus operate at the same time, thereby reducing operating noise. In addition, in a case in which the motor 36a or an electromagnetic valve is employed in the powered hydraulic pressure source 30, by suppressing such a state in which the powered hydraulic pressure source 30 and the parking brake apparatus operate at the same time, such an arrangement also reduces the risk of a voltage drop that can occur due to the inrush current.

It should be noted that the powered hydraulic pressure source 30 according to the present embodiment includes: the accumulator 35 which is capable of accumulating pressure using the brake fluid; the pump 36 which supplies the brake fluid to the accumulator 35; and the motor 36a which drives the pump 36. When the hydraulic control unit 326 acquires the parking brake apparatus operation start information in a state in which braking is being performed by means of the hydraulic braking apparatus, the hydraulic control unit 326 may switch to a smaller value the brake fluid supply start pressure (accumulator accumulation start pressure) at which the pump 36 is to start the supply of the brake fluid to the accumulator 35.

When the brake fluid is supplied to each wheel cylinder 23 from the powered hydraulic pressure source 30, the wheel cylinder pressure rises on the one hand, while, on the other hand, the accumulator pressure falls. Accordingly, after the accumulator pressure becomes smaller than the accumulator accumulation start pressure, the pump 36 is driven by the motor 36a, thereby supplying the brake fluid to the accumulator 35. Thus, by setting the accumulator accumulation start pressure to a smaller value, such an arrangement is capable of reducing the frequency of operation of the accumulator 35 and the frequency of operation of the motor 36a. In addition, such an arrangement reduces the inrush current that can occur when the motor 36a is started up.

Figure 13:
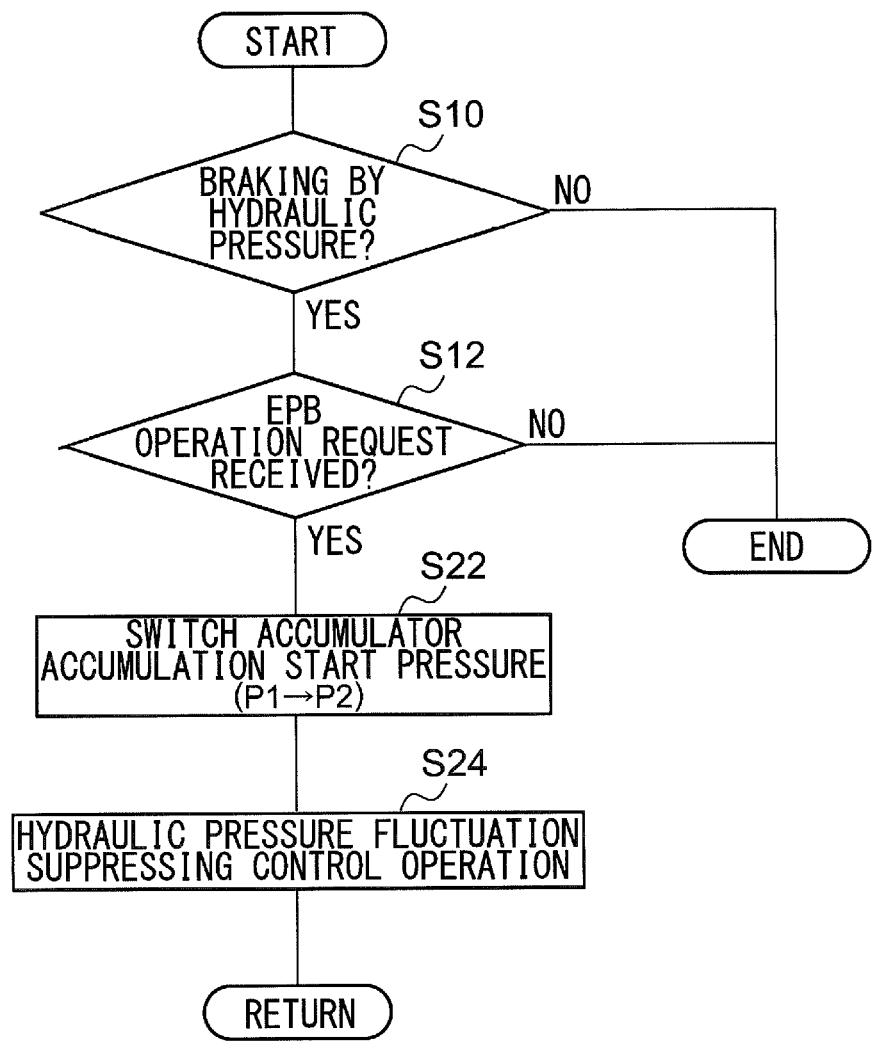
FIG. 13 is a flowchart showing an example of the control operation of a brake apparatus according to a second embodiment.

FIG. 13 is a flowchart showing an example of the control operation of the brake apparatus according to the second embodiment. It should be noted that the same steps as those in the control operation shown in FIG. 8 or FIG. 10 are denoted by the same reference symbols, and description thereof will be omitted as appropriate.

As shown in FIG. 13, when the hydraulic control unit 326 acquires the parking brake apparatus operation start information in a state in which braking is being performed by means of the hydraulic braking apparatus (YES in S12), the hydraulic control unit 326 switches the accumulator accumulation start pressure P1 [MPa], which is set for a normal hydraulic pressure control operation, to P2 [MPa] (P1 >P2) (S22). Subsequently, the hydraulic control unit 326 executes the hydraulic pressure fluctuation suppressing control operation based on the output value of the control pressure sensor 73 using the target hydraulic pressure with the dead-band region as a reference (S24).

This reduces the frequency of operation of the motor 36a included in the powered hydraulic pressure source 30. Such an arrangement suppresses a situation in which the motor 36a of the powered hydraulic pressure source 30 and the electric motor 230 of the parking brake apparatus operate at the same time. Thus, such an arrangement is capable of reducing the overall operating noise that can occur in the brake apparatus 20.

It should be noted that, during operation of the parking brake apparatus, the piston 214 is moved such that the brake pad 202 is pressed into contact with the disk rotor 22. In this state, braking force is generated. Thus, such an arrangement does not necessarily require braking force by means of the hydraulic pressure. Thus, an arrangement may be made in which, during operation of the electric motor 230 of the parking brake apparatus, the motor 36a is not driven even if the pressure in the accumulator 35 is equal to or lower than the operation start pressure at which the operation of the motor 36a is to be started.

[Adjustment of the Slope of the Target Hydraulic Pressure]

As described above, the brake apparatus 20 includes the booster linear control valve 66 and the pressure reducing linear control valve 67 each configured as an electromagnetic valve which controls the flow of the brake fluid which changes the hydraulic pressure. When there is a large reduction (hydraulic pressure fluctuation) in the wheel cylinder pressure, the brake fluid is supplied to each wheel cylinder 23 from the powered hydraulic pressure source 30 via the booster linear control valve 66. In some cases, such an arrangement has a problem of flow noise that can occur when a large quantity of brake fluid passes through the booster linear control valve 66 in a short period of time.

Similarly, when there is a large increase in the wheel cylinder pressure (hydraulic pressure fluctuation), the brake fluid is discharged from the wheel cylinder 23 to the reservoir 34 via the pressure reducing linear control valve 67. In some cases, such an arrangement has a problem of flow noise (self-induced vibration) that can occur when a large quantity of brake fluid passes through the pressure reducing linear control valve 67 in a short period of time.

In order to solve such a problem, in the case of a predetermined condition of operation of the brake apparatus 20, the slope of the target hydraulic pressure is reduced as described below. Such an arrangement is capable of reducing flow noise that can occur when the brake fluid passes through the linear control valve.

Figure 14:
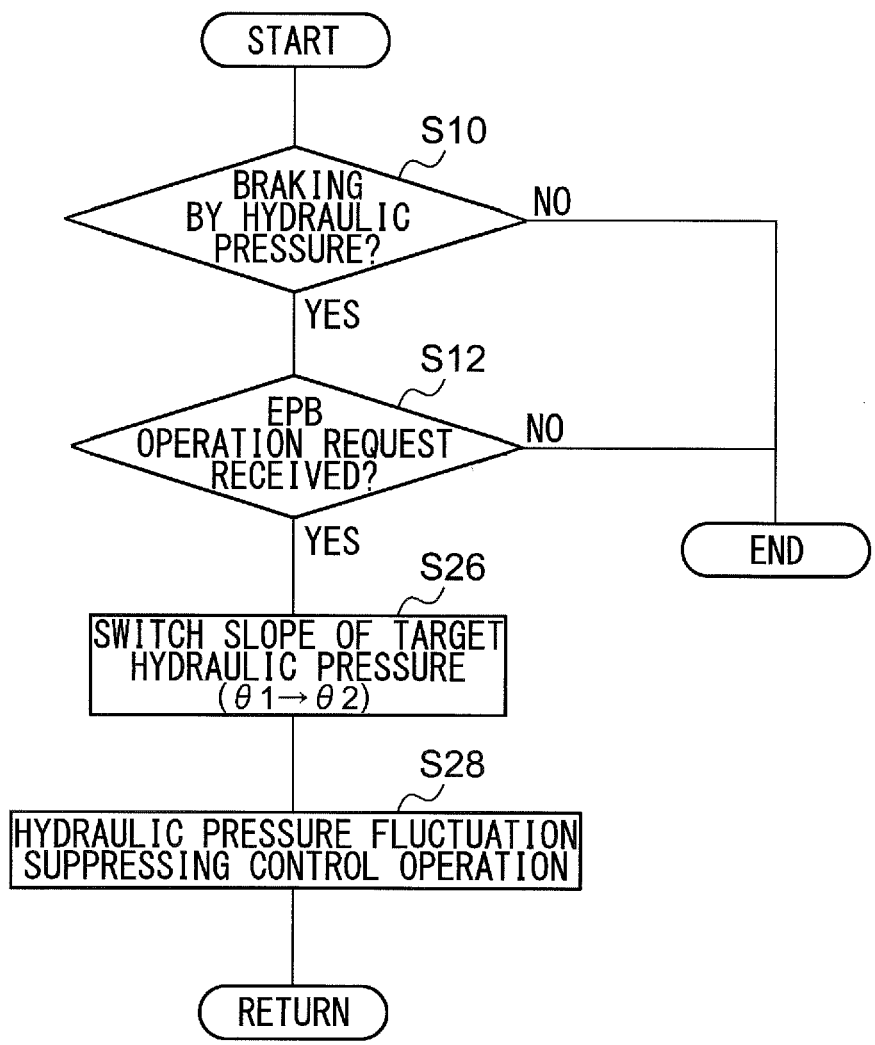
FIG. 14 is a flowchart showing an example of the brake apparatus according to the second embodiment.

FIG. 14 is a flowchart showing an example of the control operation of the brake apparatus according to the second embodiment. It should be noted that the same steps as those in the control operation shown in FIG. 8, 10, or 13 are denoted by the same reference symbols, and description thereof will be omitted as appropriate.

Figure 15:
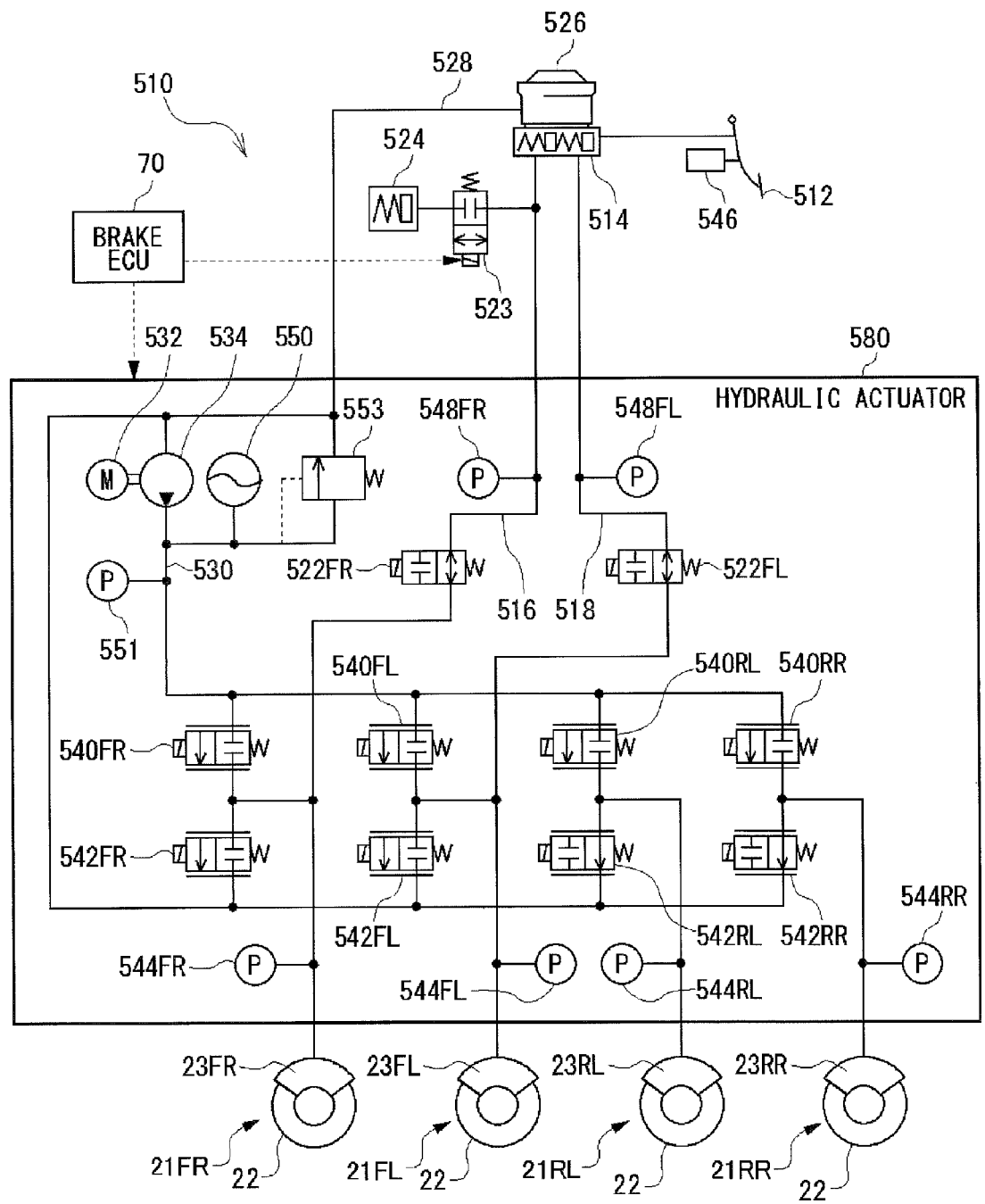
FIG. 15 is a system diagram showing a brake apparatus according to a third embodiment.

As shown in FIG. 15, when the hydraulic control unit 326 acquires the parking brake apparatus operation start information in a state in which braking is being performed by means of the hydraulic braking apparatus (YES in S12), the hydraulic control unit 326 switches the slope of the target hydraulic pressure used in the hydraulic pressure control operation of the hydraulic braking apparatus from a value θ1 which is set beforehand to a value θ2 that is smaller than θ1 (|θ1|>|θ2|) (S26). Subsequently, the hydraulic control unit 326 executes the hydraulic pressure fluctuation suppressing control operation based on the output value of the control pressure sensor 73 using as a reference the target hydraulic pressure having the slope thus reduced (S28). Thus, such an arrangement suppresses the occurrence of a sudden flow of the brake fluid. This suppresses a sudden fluctuation of the brake fluid flow at the linear control valve. Thus, such an arrangement reduces the flow noise when the brake fluid passes through the linear control valve.

[Third Embodiment]

Description will be made in the present embodiment regarding a brake apparatus having a configuration that differs from that of the brake apparatus 20 described in the first embodiment. The present invention may be applied to the brake apparatus according to the present embodiment. It should be noted that portions of the members having the same configurations as those of the brake apparatus 20 according to the first embodiment are denoted by the same reference symbols, and description thereof will be omitted as appropriate.

FIG. 15 is a system diagram showing a brake apparatus 510 according to the third embodiment. The brake apparatus 510 employs an electronically controlled brake system (ECB), which allows the brakes provided to the four wheels of the vehicle to be appropriately and independently adjusted according to the driver's operation of a brake pedal 512 configured as a brake operating member. It should be noted that the vehicle mounting the brake apparatus 510 according to the present embodiment also mounts an unshown steering apparatus which steers the steering wheels from among the four wheels; an unshown driving source such as an internal-combustion engine, an electric motor, or the like, which drives the driving wheels from among the four wheels; and the like.

The brake apparatus 510 according to the present embodiment is mounted on a hybrid vehicle including both an electric motor and an internal-combustion engine each configured as a driving source, for example. Such a hybrid vehicle is capable of using the regenerative braking force obtained by regenerating electric energy from the kinetic energy of the vehicle and the hydraulic braking force generated by the brake apparatus 510 for braking of the vehicle. The vehicle according to the present embodiment is capable of performing cooperative control of the braking mechanism and the regenerative mechanism in which the braking force is generated at a desired level using the regenerative braking mechanism and the hydraulic braking mechanism in combination. It should be noted that such a brake apparatus may use only the hydraulic braking mechanism to generate the braking force at a desired level.

The disk brake units 21FR, 21FL, 21RR, and 21RL, each configured as a braking force applying mechanism, respectively apply braking force to the right front wheel, the left front wheel, the right rear wheel, and the left rear wheel of the vehicle. The disk brake units 21FR through 21RL each include a disk rotor 22 and respectively include the wheel cylinders 23FR through 23RL each built into a brake caliper. The wheel cylinders 23FR through 23RL are connected to a hydraulic actuator 580 via different respective flow paths. It should be noted that the wheel cylinders 23FR through 23RL will collectively be referred to as the "wheel cylinders 23" hereafter as appropriate.

With the brake apparatus 510, as described later, the hydraulic actuator 580 is configured including a right master cut valve 522FR and a left master cut valve 522FL, booster valves 540FR through 540RL, pressure reducing valves 542FR through 542RL, an oil pump 534, an accumulator 550, and the like. By supplying the brake fluid from the hydraulic actuator 580 to the wheel cylinder 23, the brake pad configured as a friction member is pressed into contact with the disk rotor 22 which rotates together with the wheel. This allows the braking force to be applied to each wheel.

It should be noted that the present embodiment employs the disk brake units 21FR through 21RL. Also, the present embodiment may employ another braking force applying mechanism including the wheel cylinders 23 each configured as a drum brake or the like, for example. Alternatively, instead of a control operation for controlling the pressing pressure applied to each friction member using the hydraulic pressure, the present embodiment may employ a braking force applying mechanism configured to control the pressing force applied to each friction member using an electric-powered driving mechanism such as an electric motor or the like.

The brake pedal 512 is connected to the master cylinder 514. The master cylinder 514 transmits the brake fluid configured as an operating fluid, according to the driver's operation via depressing the brake pedal 512. The master cylinder 514 generates the hydraulic pressure according to the stroke of the brake pedal. The brake pedal 512 is provided with a stroke sensor 546 which detects the stroke of the brake pedal 512 depressed by the driver. The stroke sensor 546 is configured including as a dual sensor system, i.e., has two output systems arranged in parallel. The two output systems of the stroke sensor 546 each detect and output, independently and in parallel, the stroke of the brake pedal depressed by the driver. By configuring the stroke sensor 546 to have such a multi-output system, such an arrangement is capable of measuring the stroke of the brake pedal depressed by the driver even if a malfunction occurs in any one of the multiple output systems. Thus, such an arrangement has an advantage in providing an improved fail-safe mechanism for measuring the stroke of the brake pedal. In addition, typically, by deriving the output value of the stroke sensor 546 based on the output values of the multiple output systems (e.g., by averaging the output values of the multiple output systems), such an arrangement is capable of providing a highly reliable output value.

A sliding-type sensor may be employed as the stroke sensor 546, for example. The sliding-type stroke sensor 546 detects an electric signal that changes according to the stroke of the brake pedal 512 so as to detect the stroke of the brake pedal 512. The measurement values output in parallel from the multiple output systems of the stroke sensor are each input to an electronic control unit (which will be referred to as the "ECU" hereafter) 70. The ECU 70 calculates the stroke value based on the measurement values thus received. The stroke value thus calculated is used to calculate the target deceleration, for example. It should be noted that the stroke sensor 546 may include three or more output systems arranged in parallel. Also, the stroke sensor 546 may be configured including a single sensor and multiple switches so as to function as a virtual multi-sensor system configured to output multiple measurement values in parallel to the brake ECU 70.

One output port of the master cylinder 514 is connected to a stroke simulator 524 which generates a reaction force according to the force applied to the brake pedal 512 by the driver. A simulator cut valve 523 is provided to an intermediate position on the flow path that connects the master cylinder 514 and the stroke simulator 524. When no electric current is supplied to the simulator cut valve 523, the simulator cut valve 523 is set to the closed state. That is to say, the simulator cut valve 523 is configured as a normally-closed electromagnetic control valve which is switched to the open state when the driver's operation via the brake pedal 512 is detected. It should be noted that the simulator cut valve 523 is not an indispensable component. That is to say, the stroke simulator 524 may be directly connected to the master cylinder 514 without the simulator cut valve 523.

The aforementioned one output port of the master cylinder 514 is further connected to a brake hydraulic control pipe 516 provided for the right front wheel. The brake hydraulic control pipe 516 is connected to the wheel cylinder 23FR for the right front wheel so as to apply braking force to the unshown right front wheel. Furthermore, the other output port of the master cylinder 514 is connected to a brake hydraulic control pipe 518 for the left front wheel. The brake hydraulic control pipe 518 is connected to the wheel cylinder 23FL for the left front wheel so as to apply braking force to the unshown left front wheel.

The right master cut valve 522FR is provided to an intermediate position on the brake hydraulic control pipe 516 for the right front wheel. Furthermore, the left master cut valve 522FL is provided to an intermediate position on the brake hydraulic control pipe 518 for the left front wheel. It should be noted that the right master cut valve 522FR and the left master cut valve 522FL will collectively be referred to as the "master cut valves 522" hereafter.

The master cut valve 522 includes a spring and a solenoid to be on/off controlled. The master cut valve 522 is configured as a normally-open electromagnetic control valve which is set to the open state when no electric current is supplied to the solenoid. The master cut valve 522 is set to the closed state using the electromagnetic force generated by the solenoid according to the supply of the control current having a predetermined value. When the master cut valve 522 is set to the open state, the master cut valve 522 allows the brake fluid to flow in either direction between the master cylinder 514 and the front side wheel cylinder 23FR or 23FL. When the master cut valve 522 is closed according to the supply of the control current having a predetermined value to the solenoid, the flow of the brake fluid is shut off.

Furthermore, the right master pressure sensor 548FR which detects the master cylinder pressure on the right front wheel side is provided to an intermediate position on the brake hydraulic control pipe 516 for the right front wheel. Moreover, the left master pressure sensor 548FL which detects the master cylinder pressure on the left front wheel side is provided to an intermediate position on the brake hydraulic control pipe 518 for the left front wheel. With the brake apparatus 510, when the driver depresses the brake pedal 512, the operation value of this depression of the brake pedal 512 is detected by the stroke sensor 546. In addition, the depression force (depressing force) applied to the brake pedal 512 can be calculated based on the master cylinder pressure values detected by the right master pressure sensor 548FR and the master cylinder pressure detected by the left master pressure sensor 548FL. As described above, the master cylinder pressure may preferably be monitored using the two pressure sensors 548FR and 548FL assuming that a malfunction can occur in the stroke sensor 546, thereby providing a fail-safe mechanism for measuring the depression force. It should be noted that the right master pressure sensor 548FR and the left master pressure sensor 548FL will collectively be referred to as the "master pressure sensors 548" hereafter as appropriate.

Furthermore, the master cylinder 514 is connected to a reservoir tank 526 configured to reserve the brake fluid. The reservoir tank 526 is connected to one end of the hydraulic pressure supply/discharge pipe 528. The other end of the hydraulic pressure supply/discharge pipe 528 is connected to the inlet of the oil pump 534 which is driven by the motor 532. The outlet of the oil pump 534 is connected to a high-pressure pipe 530. The high-pressure pipe 530 is connected to the accumulator 550 and a relief valve 553. With the present embodiment, as such an oil pump 534, such an arrangement employs a reciprocating pump including two or more pistons (not shown) configured to be reciprocated by the motor 532. Furthermore, as the accumulator 550, such an arrangement employs a component configured to convert the pressure energy of the brake fluid into the pressure energy of the enclosed gas such as nitrogen or the like, and to store the pressure energy thus converted. It should be noted that the motor 532, the oil pump 534, and the accumulator 550 may be configured as components separate from the hydraulic actuator 580, and may be arranged as components external to the hydraulic actuator 580.

The accumulator 550 stores the brake fluid having a pressure which is boosted by the oil pump 534 on the order of 10 MPa to 22 MPa, for example. The valve outlet of the relief valve 553 is connected to the hydraulic pressure supply/discharge pipe 528. When the pressure of the brake fluid accumulated by the accumulator 550 exhibits an abnormally high value on the order of 25 MPa, for example, the relief valve 553 is opened, which returns the high-pressure brake fluid to the hydraulic pressure supply/discharge pipe 528. Furthermore, the high-pressure pipe 530 is provided with an accumulator pressure sensor 551 which detects the pressure at the outlet of the accumulator 550, i.e., the pressure of the brake fluid in the accumulator 550.

Furthermore, the high-pressure pipe 530 is connected to the wheel cylinder 23FR for the right front wheel, the wheel cylinder 23FL for the left front wheel, the wheel cylinder 23RR for the right rear wheel, and the wheel cylinder 23RL for the left rear wheel via the booster valves 540FR, 540FL, 540RR, and 540RL, respectively. The booster valves 540FR, 540FL, 540RR, and 540RL, will collectively be referred to as the "booster valves 540" hereafter as appropriate. Each booster valve 540 includes a liner solenoid and a spring. The booster valves 540 are each configured as a normally-closed electromagnetic flow control valve (linear valve) which is closed when no electric current is supplied to the solenoid. Each booster valve 540 is arranged such that the pressure difference between the accumulator pressure on the upstream side and the wheel cylinder pressure on the downstream side functions as a force which attempts to open the booster valve 540. The booster valves 540 are each configured such that its valve aperture is adjusted in proportion to the electric current supplied to the solenoid included in the valve. The pressure on the upstream side, i.e., the accumulator pressure, is supplied via each booster valve 540, thereby increasing the pressure in the wheel cylinder 23.

Furthermore, the wheel cylinder 23FR for the right front wheel and the wheel cylinder 23FL for the left front wheel are each connected to the hydraulic pressure supply/discharge pipe 528 via the respective pressure reducing valves 542FR and 542FL on the front wheel side. The pressure reducing valves 542FR and 542FL are each configured as a normally-closed electromagnetic control valve (linear valve) used to reduce the pressure in the wheel cylinders 23FR and 23FL as necessary. The pressure reducing valves 542FR and 542FL each include a linear solenoid and a spring. The pressure reducing valves 542FR and 542FL are each configured to be closed when no electric current is supplied to the solenoid. Furthermore, the pressure reducing valves 542FR and 542FL are each configured such that its valve aperture is adjusted in proportion to the electric current supplied to the solenoid. The pressure reducing valves 542FR and 542FL are each arranged such that the pressure difference between the wheel cylinder pressure on the upstream side and the reservoir pressure on the downstream side (atmospheric pressure) functions as a force which attempts to open the pressure reducing valve.

On the other hand, the wheel cylinder 23RR for the right rear wheel and the wheel cylinder 23RL for the left rear wheel are connected to the hydraulic pressure supply/discharge pipe 528 via the pressure reducing valves 542RR and 542RL each configured as a normally-open electromagnetic control valve. The pressure reducing valves 542RR and 542RL for the rear wheel side each include a linear solenoid and a spring. The pressure reducing valves 542RR and 542RL are each configured such that, when no current is supplied to the solenoid, the pressure reducing valve is open, and such that the aperture of the valve is adjusted in proportion to the current supplied to the solenoid. Furthermore, when the current supplied to the solenoid exceeds a predetermined current value determined according to the wheel cylinder, the pressure reducing valve is closed. The pressure reducing valves 542RR and 542RL are each arranged such that the pressure difference between the wheel cylinder pressure on the upstream side and the reservoir pressure (atmospheric pressure) on the downstream side functions as a force which attempts to open the pressure reducing valves. The pressure reducing valves 542FR and 542RL will collectively be referred to as the "pressure reducing valves 542" hereafter as appropriate.

Furthermore, wheel cylinder pressure sensors 544FR, 544FL, 544RR, and 544RL are provided in the vicinity of the wheel cylinder 23FR for the right front wheel, the wheel cylinder 23FL for the left front wheel, the wheel cylinder 23RR for the right rear wheel, and the wheel cylinder 23RL for the left rear wheel, respectively. The wheel cylinder pressure sensors 544FR, 544FL, 544RR, and 544RL each detect the wheel cylinder pressure which is the pressure of the brake fluid applied to the corresponding wheel cylinder 23. The wheel cylinder pressure sensors 544FR through 544RL will collectively be referred to as the "wheel cylinder pressure sensors 544" hereafter as appropriate.

The hydraulic actuator 580 is controlled by the brake ECU 70 configured as a control unit according to the present embodiment. The brake ECU 70 includes a CPU which executes various kinds of calculation operations, ROM which stores various kinds of control programs, RAM used as a work area for storing data and for executing the programs, an input/output interface, memory, and the like.

The brake ECU 70 is connected to the stroke sensor 546, the master pressure sensors 548, and the wheel cylinder pressure sensors 544. The stroke sensor 546, the master pressure sensors 548, and the wheel cylinder pressure sensors 544 each output a signal which represents a measurement value. The brake ECU 70 receives the output signal of each sensor as an input signal. The detection value detected by each sensor is supplied to the brake ECU 70 at predetermined intervals of time, and is stored in a predetermined storage area of the brake ECU 70.

The brake apparatus 510 thus configured as described above is capable of executing cooperative control of the braking mechanism and the regenerative mechanism, for example. After the brake apparatus 510 receives a braking request, the brake apparatus 510 starts braking. Such a braking request is generated when braking force is to be applied to the vehicle, e.g., when the driver operates the brake pedal 512. When the braking-on condition is satisfied, the brake ECU 70 judges that the driver has operated the brake so as to generate the braking request. On the other hand, when the braking-off condition is satisfied, the brake ECU 70 judges that the driver has released the brake and the braking request is released. For example, when the braking-on condition is not satisfied, the brake ECU 70 may judge that the braking-off condition is satisfied.

After the brake ECU 70 receives a braking request, the brake ECU 70 calculates the target deceleration, i.e., the requested braking force, based on the stroke value of the depression of the brake pedal 512 and the master cylinder pressure. The brake ECU 70 subtracts the regenerative braking force from the requested braking force so as to calculate the requested hydraulic pressure braking force, which is a braking force to be generated by the brake apparatus 510. With such an arrangement, the regenerative braking force is supplied from the higher-level hybrid ECU (not shown) to the brake apparatus 510. Subsequently, the brake ECU 70 calculates the target hydraulic pressure to be set for each of the wheel cylinders 23FR through 23RL based on the requested hydraulic pressure braking force thus calculated. The brake ECU 70 determines the control current value to be supplied to each of the booster valve 540 and the pressure reducing valve 542 by means of a feedback control operation such that the wheel cylinder pressure matches the target hydraulic pressure. The brake ECU 70 repeatedly executes calculation of the target deceleration and the target hydraulic pressure and a control operation for each control valve at a predetermined cycle during the braking operation.

As a result, for the brake apparatus 510, the brake fluid is supplied to each wheel cylinder 23 from the accumulator 550 via the booster valve 540, thereby applying a desired braking force to the wheels. Furthermore, the brake fluid is discharged from each wheel cylinder 23 via the corresponding pressure reducing valve 542 according to a need, thereby adjusting the braking force applied to the wheels. As described above, such an arrangement provides a so-called brake-by-wire braking force control operation.

With such an arrangement, in the normal state, the right master cut valve 522FR and the left master cut valve 522FL are each set to the closed state. In the cooperative control of the braking mechanism and the regenerative mechanism, a pressure difference occurs between the upper stream side and the downstream side of the master cut valve 522 according to the value of the regenerative braking force. After the brake fluid is transmitted from the master cylinder 514 due to the driver depressing the brake pedal 512, the brake fluid flows into the stroke simulator 524. This generates a suitable pedal reaction force.

With the present embodiment, when the brake system is in the normal state, and when the driver's operation of the brake, e.g., the pedal stroke, exceeds the braking-on judgment threshold value, the brake ECU 70 takes this to be the conditions for braking-on. For example, when the pedal stroke values respectively calculated based on the detection values of the respective output systems of the stroke sensor 546 all exceed the braking-on judgment threshold value, the brake ECU 70 takes this to be the conditions for braking-on. Furthermore, the brake ECU 70 judges whether the conditions are braking-on or not based on the measurement value of the right master pressure sensor 548FR and the measurement value of the left master pressure sensor 548FL which are each employed as the brake operation input value. Also, when both the measurement value of the right master pressure sensor 548FR and the measurement value of the left master pressure sensor 548FL exceed the respective hydraulic pressure threshold values set beforehand, the brake ECU 70 may take this to be the conditions for braking-on.

With such an arrangement, when the brake system is in the normal state, the target deceleration is calculated as follows. First, the brake ECU 70 reads out the pedal stroke ST measured by the stroke sensor 546 and the master cylinder pressure PMC measured by the master pressure sensor 548. It should be noted that either one of the two measurement values measured by the master pressure sensors 548 may be employed as the aforementioned measurement value. Also, the aforementioned measurement value may be obtained by averaging the two measurement values. Also, the brake ECU 70 may apply low-pass filtering to the input signals as appropriate so as to obtain a smoothed signal.

The brake ECU 70 calculates the stroke-based target deceleration $G_{ST}$ based on the measurement value of the pedal stroke ST. For example, the brake ECU 70 stores beforehand the relation between the pedal stroke ST and the stroke-based target deceleration $G_{ST}$ in the form of mapped data. As an example, the relation is set such that the stroke-based target deceleration $G_{ST}$ is increased according to an increase in the pedal stroke ST.

Furthermore, the brake ECU 70 calculates the master-cylinder-pressure-based target deceleration $G_{PMC}$ from the measurement value of the master cylinder pressure PMC. The brake ECU 70 also stores beforehand the relation between the master cylinder pressure PMC and the master-cylinder-pressure-based target deceleration $G_{PMC}$ in the form of mapped data. For example, this relation is set such that the master cylinder pressure PMC and the master-cylinder-pressure-based target deceleration $G_{PMC}$ have an approximately linear relation.

As the weighted average value of the aforementioned stroke-based target deceleration $G_{ST}$ and the master-cylinder-pressure-based target deceleration $G_{PMC}$, the brake ECU 70 calculates the overall target deceleration $G_0$ using the following Expression (1).

$$G_0 = \gamma \cdot G_{PMC} + (1-\gamma) \cdot G_{ST} \tag{1}$$

Here, the coefficient $\gamma$ represents a weighting factor for the master-cylinder-pressure-based target deceleration $G_{PMC}$, and is set to a value ranging between 0 and 1. The brake ECU 70 calculates the coefficient $\gamma$ based on the master-cylinder-pressure-based target deceleration $G_{PMC}$, for example. The brake ECU 70 sets and stores beforehand the relation between the master-cylinder-pressure-based target deceleration $G_{PMC}$ and the coefficient $\gamma$.

Furthermore, the brake ECU 70 calculates the target hydraulic pressure to be set for each wheel cylinder 23 based on the overall target deceleration $G_0$ thus calculated. The brake ECU 70 controls the booster valve 540 and the pressure reducing valve 542 such that each wheel cylinder pressure matches the target hydraulic pressure.

It should be noted that, even in a case in which the requested braking force is supplied using only the hydraulic pressure braking force without using the regenerative braking force, the brake apparatus 510 according to the present embodiment is capable of controlling the braking force. The control mode in which the braking force is controlled by means of the booster valve 540 and the pressure reducing valve 542 will be referred to as the "linear control mode" hereafter as appropriate regardless of whether or not cooperative control of the braking mechanism and the regenerative mechanism is executed. Alternatively, in some cases, such a control mode is referred to as "brake-by-wire control mode". When the brake system operates normally, the linear control mode is selected, and the braking force is controlled in the linear control mode.

During control in the linear control mode, in some cases, the wheel cylinder pressure deviates from the target hydraulic pressure due to a delay in the response of the operating hydraulic pressure, overshoot, or the like. The brake ECU 70 cyclically judges, based on the measurement value of the wheel cylinder pressure sensor 544, whether or not any response abnormality has occurred in the wheel cylinder pressure, for example. When a situation in which the deviation of the wheel cylinder pressure measurement value from the target hydraulic pressure is greater than a reference value continues for a predetermined period of time or more, the brake ECU 70 judges that a control response abnormality has occurred in the wheel cylinder pressure, for example. When judgment has been made that an abnormality has occurred in the control response of the wheel cylinder pressure, the brake ECU 70 suspends the linear control mode, and switches the control mode to a brake mode prepared as a backup mode. Also, in some cases, a malfunction (e.g., sensor malfunction) occurs in a portion of the brake system. In this case, the brake ECU 70 may also suspend the linear control mode, and may switch the control mode to the backup brake mode (which will be referred to as the "backup control mode" hereafter as appropriate).

In the backup control mode, input force of the driver's operation of the brake pedal 512 is converted into hydraulic pressure, and is mechanically transmitted to each wheel cylinder 23, thereby applying braking force to each wheel. In this mode, the brake ECU 70 suspends the control operation for the booster valves 540 and the pressure reducing valves 542. In this state, the open/closed state of each of the booster valve 540 and the pressure reducing valve 542 is set to the initial state. That is to say, all the booster valves 540 are closed. Furthermore, of the pressure reducing valves 542, the pressure reducing valves 542FR and 542FL each configured as a front-side pressure reducing valve are each closed. In contrast, of the pressure reducing valves 542, the pressure reducing valves 542RR and 542RL each configured as a rear-side pressure reducing valve are each opened. Moreover, the master cut valve 522 is opened. It should be noted that, with the present embodiment, the booster valve 540 and the pressure reducing valve 542 are provided to each wheel. Thus, the brake ECU 70 may judge for each wheel whether or not a response abnormality has occurred in the wheel cylinder pressure. Also, the brake ECU 70 may switch the control mode to the backup control mode only for the wheel cylinder in which an abnormality has been detected.

The brake apparatus 510 according to the present embodiment includes a parking brake apparatus (see FIG. 2) connected to the brake hydraulic pressure circuit in the same way as the brake apparatus 20 according to the first embodiment. With the present embodiment, the parking brake apparatus is also configured to mechanically transmit a driving force to the piston of the wheel cylinder 23 by means of the operation of an electric motor, thereby displacing the piston.

The brake apparatus 510 according to the present embodiment configured as described above provides the same effects and advantages as those provided by the brake apparatus 20 according to the first embodiment. Specific description will be made below.

The brake apparatus 510 includes: a piston 214 which is displaced with respect to a disk rotor 22; a brake pad 202 which is pressed into contact with the disk rotor 22 by being pressed by the piston 214 thus displaced, so as to generate a braking force; a hydraulic actuator 580 which displaces the piston 214 via hydraulic pressure; a parking brake apparatus which displaces the piston 214 by means of a force that differs from the hydraulic pressure; and a brake ECU 70 which controls the hydraulic actuator 580 based on the information acquired from a wheel cylinder pressure sensor 544 which detects information having a correlation with the hydraulic pressure applied to the piston 214. When the parking brake apparatus operates in a state in which braking is being performed by means of the hydraulic actuator 580, the brake ECU 70 controls the hydraulic actuator 580 or otherwise the parking brake apparatus so as to suppress fluctuation of the hydraulic pressure.

With such an embodiment, when the parking brake apparatus operates in a state in which braking is being performed by means of the hydraulic actuator 580, such an arrangement suppresses fluctuation of the hydraulic pressure. Thus, such an arrangement suppresses execution of unnecessary braking control.

When the brake ECU 70 acquires the parking brake apparatus operation start information in a state in which braking is being performed by the hydraulic actuator 580, the brake ECU 70 switches the control operation of the hydraulic actuator 580 so as to raise to a higher level the responsiveness of the operation of the hydraulic actuator 580. This allows fluctuation of the hydraulic pressure to be suppressed in an early stage when the parking brake apparatus is operated in a state in which braking is being performed by the hydraulic actuator 580.

The brake apparatus 510 further includes a wheel cylinder pressure sensor 544 which detects information having a correlation with the hydraulic pressure applied to the piston 214, e.g., the wheel cylinder pressure. In a state in which the parking brake apparatus is not operating, the brake ECU 70 controls the hydraulic actuator 580 according to the output value of the wheel cylinder pressure sensor 544 using as a reference the target hydraulic pressure with a dead-band region having a first width. When the brake ECU 70 acquires the parking brake apparatus operation start information in a state in which braking is being performed by means of the hydraulic actuator 580, the brake ECU 70 controls the hydraulic actuator 580 according to the output value of the wheel cylinder pressure sensor 544 using as a reference the target hydraulic pressure with a dead-band region having a second width that is smaller than the first width. This raises the responsiveness of the operation of the hydraulic actuator 580. Such an arrangement allows fluctuation of the hydraulic pressure to be suppressed in an early stage when the parking brake apparatus is operated in a state in which braking is being performed by means of the hydraulic actuator 580.

The brake apparatus 510 includes a booster valve 540 and a pressure reducing valve 542 each configured as an electromagnetic control valve which controls the flow of the brake fluid used to change the hydraulic pressure. When the brake ECU 70 acquires the parking brake apparatus operation start information in a state in which braking is being performed by means of the hydraulic actuator 580, the brake ECU 70 performs a control operation for supplying electric current to each control valve so as to raise the responsiveness of each of the booster valves 540 and the pressure reducing valves 542. This reduces the time lag from the transmission of an instruction to each of the booster valves 540 and the pressure reducing valves 542 to open or close the valve up to the actual opening or closing of the valve. Thus, such an arrangement allows fluctuation of the hydraulic pressure to be suppressed in an early stage when the parking brake apparatus is operated in a state in which braking is being performed by means of the hydraulic actuator 580.

Also, when the brake ECU 70 acquires the parking brake apparatus operation start information in a state in which braking is being performed by the hydraulic actuator 580, the brake ECU 70 may switch the operation gain of the electric motor 230 of the parking brake apparatus to a smaller value. This allows the rate of fluctuation of the hydraulic pressure to be reduced when the parking brake apparatus starts to operate in a state in which braking is being performed by the hydraulic actuator 580.

Furthermore, the brake apparatus 510 further includes a powered hydraulic pressure source which supplies the brake fluid to each wheel cylinder 23 which is provided with the piston 214. The brake ECU 70 may control the powered hydraulic pressure source such that operation of the powered hydraulic pressure source is suppressed during operation of the parking brake apparatus. This prevents the powered hydraulic pressure source and the parking brake apparatus from operating at the same time, thereby reducing operating noise. Also, in a case in which an electric motor or an electromagnetic valve is employed in the powered hydraulic pressure source, by preventing by suppressing a situation in which the powered hydraulic pressure source and the parking brake apparatus operates at the same time, such an arrangement allows the voltage drop due to inrush current to be reduced.

The powered hydraulic pressure source according to the present embodiment includes: an accumulator 550 configured to accumulate pressure using the brake fluid; an oil pump 534 which supplies the brake fluid to the accumulator 550; and a motor 532 which drives the oil pump 534. When the brake ECU 70 acquires the parking brake apparatus operation start information in a state in which braking is being performed by the hydraulic actuator 580, the brake ECU 70 may switch the brake fluid supply start pressure at which the supply of the brake fluid to the accumulator 550 by means of the oil pump 534 is to be started to a smaller value than the prior brake fluid supply start pressure. This reduces the frequency of operation of the hydraulic actuator 580. This suppresses a situation in which the hydraulic actuator 580 and the parking brake apparatus operate at the same time.

When the brake ECU 70 acquires the parking brake apparatus operation start information in a state in which braking is being performed by means of the hydraulic actuator 580, the brake ECU 70 may switch the slope of the target hydraulic pressure used in the hydraulic control operation of the hydraulic actuator 580 to a value that is smaller than the previously set value. This suppresses the occurrence of a sudden flow of the brake fluid, thereby reducing the flow noise that can occur when the brake fluid passes through the booster valve 540 or the pressure reducing valve 542, for example.

The present invention described as examples in the aforementioned embodiments can be regarded as an embodiment described below. As such an embodiment, the brake ECU 70 may be configured as a braking control apparatus. The brake ECU 70 controls: a hydraulic braking apparatus which displaces, via hydraulic pressure, the piston 214 configured to be displaced with respect to the disk rotor 22; and a parking brake apparatus which displaces the piston 214 by means of a force that differs from the hydraulic pressure. Furthermore, the brake ECU 70 controls the hydraulic braking apparatus based on the information acquired from the wheel cylinder pressure sensor 544 or the control pressure sensor 73 which detects information having a correlation with the hydraulic pressure applied to the piston 214. In addition, when the parking brake apparatus operates in a state in which braking is being performed by means of the hydraulic braking apparatus, the brake ECU 70 controls the hydraulic braking apparatus or the parking brake apparatus so as to suppress fluctuation of the hydraulic pressure.

Description has been made above regarding the present invention with reference to the aforementioned embodiments. However, the present invention is by no means intended to be restricted to the aforementioned embodiments.

Also, various modifications may be made by appropriately combining or replacing components of the aforementioned embodiments, which are also encompassed within the scope of the present invention. Also, various modifications may be made by modifying a combination of the embodiments, or otherwise modifying the order of the processing steps, or various designs may be modified, based on the knowledge of those skilled in this art, which are also encompassed within the scope of the present invention.

Description has been made in the aforementioned embodiment regarding the configuration of the brake apparatus with reference to the brake apparatus 20 configured as an electronic brake control system shown in FIG. 1, for example. Also, the technique described in the present embodiment may be applied to conventional brake control systems, e.g., a brake control system having no powered hydraulic pressure source 30 and configured such that the master cylinder unit 27 functions as a first driving source.

The viscosity of the brake fluid changes according to the temperature. Thus, the brake ECU 70 may estimate the temperature of the brake fluid based on a detection result received from a temperature sensor or the operation state of the apparatus, and may change the braking control timing according to the temperature thus estimated.

DESCRIPTION OF THE REFERENCE NUMERALS 20 brake apparatus, 22 disk rotor, 23, 24 brake pedal, 30 powered hydraulic pressure source, 35 accumulator, 36 pump, 36a motor, 40 hydraulic actuator, 66 booster linear control valve, 67 pressure reducing linear control valve, 70 brake ECU, 73 control pressure sensor, 202 brake pad, 214 piston, 230 electric motor, 300 state quantity acquisition unit, 302 hydraulic pressure acquisition unit, 324 control mode determination unit, 326 hydraulic control unit, 328 parking brake control unit, 510 brake apparatus, 512 brake pedal, 532 motor, 550 accumulator.

INDUSTRIAL APPLICABILITY

The present invention relates to a brake apparatus. In particular, the present invention is applicable to a vehicle brake apparatus configured such that a piston of a wheel cylinder is shared by a hydraulic braking apparatus and a parking brake apparatus.

The invention claimed is:
1. A brake apparatus comprising:
a displacement member configured to be displaced with respect to a disk rotor;
a friction member configured to press the disk rotor by being pressed by the displacement member thus displaced;
a hydraulic braking apparatus configured to displace the displacement member by means of hydraulic pressure;
an electric-powered braking apparatus configured to displace the displacement member by means of a force that differs from the hydraulic pressure;
a control unit configured to control the hydraulic braking apparatus based on information acquired from a detection unit configured to detect information having a correlation with the hydraulic pressure applied to the displacement member,
wherein, when the electric-powered braking apparatus operates to displace the displacement member in a state in which braking is being performed by means of the hydraulic braking apparatus, the control unit controls the hydraulic braking apparatus so as to suppress fluctuation of the hydraulic pressure, and
wherein, when the control unit acquires electric-powered braking apparatus operation start information in a state in which braking is being performed by means of the hydraulic braking apparatus, the control unit controls the control operation of the hydraulic control apparatus so as to raise responsiveness of the operation of the hydraulic braking apparatus to a higher level; and
a hydraulic pressure sensor configured as a detection unit which detects information having a correlation with the hydraulic pressure applied to the displacement member,
wherein, when the electric-powered braking apparatus is in a state in which it is not operating, the control unit is configured to control the hydraulic braking apparatus based on an output value of the hydraulic pressure sensor using as a reference a target hydraulic pressure provided with a dead-band region having a first width, and
wherein, when the control unit acquires the electric-powered braking apparatus operation start information in a state in which braking is being performed by means of the hydraulic braking apparatus, the control unit is configured to control the hydraulic braking apparatus based on an output value of the hydraulic pressure sensor using as a reference a target hydraulic pressure provided with a dead-band region having a second width that is smaller than the first width.

2. The brake apparatus according to claim 1, further comprising:
a wheel cylinder provided with the displacement member; and
a hydraulic circuit configured such that it communicates with the wheel cylinder.

3. The brake apparatus according to claim 1, wherein the hydraulic braking apparatus is configured to adjust the wheel cylinder hydraulic pressure according to an operation value of a brake pedal, and
wherein the electric-powered braking apparatus is configured as a parking brake apparatus which mechanically transmits a driving force to the displacement member by means of the operation of the electric motor.

4. A brake apparatus comprising:
a displacement member configured to be displaced with respect to a disk rotor;
a friction member configured to press the disk rotor by being pressed by the displacement member thus displaced;
a hydraulic braking apparatus configured to displace the displacement member by means of hydraulic pressure;
an electric-powered braking apparatus configured to displace the displacement member by means of a force that differs from the hydraulic pressure;
a control unit configured to control the hydraulic braking apparatus based on information acquired from a detection unit configured to detect information having a correlation with the hydraulic pressure applied to the displacement member,
wherein, when the electric-powered braking apparatus operates to displace the displacement member in a state in which braking is being performed by means of the hydraulic braking apparatus, the control unit controls the hydraulic braking apparatus so as to suppress fluctuation of the hydraulic pressure, and
wherein, when the control unit acquires electric-powered braking apparatus operation start information in a state in which braking is being performed by means of the hydraulic braking apparatus, the control unit controls the control operation of the hydraulic control apparatus so as to raise responsiveness of the operation of the hydraulic braking apparatus to a higher level; and a hydraulic pressure sensor configured as a detection unit which detects information having a correlation with the hydraulic pressure applied to the displacement member, wherein, when the electric-powered braking apparatus is in a state in which it is not operating, the control unit is configured to control the hydraulic braking apparatus based on an output value of the hydraulic pressure sensor using as a reference a first target hydraulic pressure, and wherein, when the control unit acquires the electric-powered braking apparatus operation start information in a state in which braking is being performed by means of the hydraulic braking apparatus, the control unit is configured to control the hydraulic braking apparatus based on an output value of the hydraulic pressure sensor using as a reference a second target hydraulic pressure that is greater than the first target hydraulic pressure.

5. A brake apparatus comprising:

a displacement member configured to be displaced with respect to a disk rotor;

a friction member configured to press the disk rotor by being pressed by the displacement member thus displaced;

a hydraulic braking apparatus configured to displace the displacement member by means of hydraulic pressure;

an electric-powered braking apparatus configured to displace the displacement member by means of a force that differs from the hydraulic pressure;

a control unit configured to control the hydraulic braking apparatus based on information acquired from a detection unit configured to detect information having a correlation with the hydraulic pressure applied to the displacement member, wherein, when the electric-powered braking apparatus operates to displace the displacement member in a state in which braking is being performed by means of the hydraulic braking apparatus, the control unit controls the hydraulic braking apparatus so as to suppress fluctuation of the hydraulic pressure, and wherein, when the control unit acquires electric-powered braking apparatus operation start information in a state in which braking is being performed by means of the hydraulic braking apparatus, the control unit controls the control operation of the hydraulic control apparatus so as to raise responsiveness of the operation of the hydraulic braking apparatus to a higher level; and an electromagnetic control valve configured to control the flow of an operating fluid to be used to change the hydraulic pressure, wherein, when the control unit acquires the electric-powered braking apparatus operation start information in a state in which braking is being performed by means of the hydraulic braking apparatus, the control unit performs a control operation for supplying electric current to the electromagnetic control valve so as to raise the responsiveness of the electromagnetic control valve, and wherein, when the control unit acquires the electric-powered braking apparatus operation start information in a state in which braking is being performed by means of the hydraulic braking apparatus, the control unit performs an electric current supply control operation for supplying the electromagnetic control valve with an electric current having a current value which does not switch the open/closed state of the electromagnetic control valve.

6. A brake apparatus comprising:

a displacement member configured to be displaced with respect to a disk rotor;

a friction member configured to press the disk rotor by being pressed by the displacement member thus displaced;

a hydraulic braking apparatus configured to displace the displacement member by means of hydraulic pressure;

an electric-powered braking apparatus configured to displace the displacement member by means of a force that differs from the hydraulic pressure; and a control unit configured to control the hydraulic braking apparatus based on information acquired from a detection unit configured to detect information having a correlation with the hydraulic pressure applied to the displacement member, wherein, when the electric-powered braking apparatus operates to displace the displacement member in a state in which braking is being performed by means of the hydraulic braking apparatus, the control unit controls the hydraulic braking apparatus so as to suppress fluctuation of the hydraulic pressure, wherein, when the control unit acquires electric-powered braking apparatus operation start information in a state in which braking is being performed by means of the hydraulic braking apparatus, the control unit controls the control operation of the hydraulic control apparatus so as to raise responsiveness of the operation of the hydraulic braking apparatus to a higher level, and wherein when the control unit acquires the electric-powered braking apparatus operation start information in a state in which braking is being performed by means of the hydraulic braking apparatus, the control unit switches an operation gain of the electric-powered braking apparatus to a value that is smaller than a prior value.

7. A brake apparatus comprising:

a displacement member configured to be displaced with respect to a disk rotor;

a friction member configured to press the disk rotor by being pressed by the displacement member thus displaced;

a hydraulic braking apparatus configured to displace the displacement member by means of hydraulic pressure;

an electric-powered braking apparatus configured to displace the displacement member by means of a force that differs from the hydraulic pressure;

a control unit configured to control the hydraulic braking apparatus based on information acquired from a detection unit configured to detect information having a correlation with the hydraulic pressure applied to the displacement member, wherein, when the electric-powered braking apparatus operates to displace the displacement member in a state in which braking is being performed by means of the hydraulic braking apparatus, the control unit controls the hydraulic braking apparatus so as to suppress fluctuation of the hydraulic pressure, and wherein, when the control unit acquires electric-powered braking apparatus operation start information in a state in which braking is being performed by means of the hydraulic braking apparatus, the control unit controls the control operation of the hydraulic control apparatus so as to raise responsiveness of the operation of the hydraulic braking apparatus to a higher level; and a powered hydraulic pressure source configured to supply the operating fluid to each wheel cylinder provided with the displacement member, wherein the control unit controls the powered hydraulic pressure source so as to suppress a situation in which the powered hydraulic pressure source operates during operation of the electric-powered braking apparatus, wherein the powered hydraulic pressure source comprises:
an accumulator configured to accumulate pressure using the operating fluid;
a pump configured to supply the operating fluid to the accumulator; and
a motor configured to drive the pump, and wherein, when the control unit acquires the electric-powered braking apparatus operation start information in a state in which braking is being performed by means of the hydraulic braking apparatus, the control unit switches the operating fluid supply start pressure at which the supply of the operating fluid to the accumulator by means of the pump is to be started, to a smaller value than the prior operating fluid supply start pressure.

8. A brake apparatus comprising:
a displacement member configured to be displaced with respect to a disk rotor;
a friction member configured to press the disk rotor by being pressed by the displacement member thus displaced;
a hydraulic braking apparatus configured to displace the displacement member by means of hydraulic pressure;
an electric-powered braking apparatus configured to displace the displacement member by means of a force that differs from the hydraulic pressure; and
a control unit configured to control the hydraulic braking apparatus based on information acquired from a detection unit configured to detect information having a correlation with the hydraulic pressure applied to the displacement member, wherein, when the electric-powered braking apparatus operates to displace the displacement member in a state in which braking is being performed by means of the hydraulic braking apparatus, the control unit controls the hydraulic braking apparatus so as to suppress fluctuation of the hydraulic pressure, wherein, when the control unit acquires electric-powered braking apparatus operation start information in a state in which braking is being performed by means of the hydraulic braking apparatus, the control unit controls the control operation of the hydraulic control apparatus so as to raise responsiveness of the operation of the hydraulic braking apparatus to a higher level, and wherein, when the control unit acquires the electric-powered braking apparatus operation start information in a state in which braking is being performed by means of the hydraulic braking apparatus, the control unit switches the slope of a target hydraulic pressure used for a hydraulic pressure control operation for the hydraulic braking apparatus, to a value that is smaller than a value set beforehand.

9. A braking control apparatus comprising a control unit configured to control: a hydraulic braking apparatus configured to displace, by means of hydraulic pressure, a displacement member to be displaced with respect to a disk rotor; and an electric-powered braking apparatus configured to displace the displacement member by means of a force that differs from the hydraulic pressure, wherein the control unit is configured to control the hydraulic braking apparatus based on information acquired from a detection unit configured to detect information having a correlation with the hydraulic pressure applied to the displacement member, wherein, when the electric-powered braking apparatus operates to displace the displacement member in a state in which braking is being performed by means of the hydraulic braking apparatus, the control unit controls the hydraulic braking apparatus so as to suppress fluctuation of the hydraulic pressure, wherein, when the control unit acquires operation start information for the electric-powered braking apparatus in a state in which braking is being performed by means of the hydraulic braking apparatus, the control unit controls the control operation of the hydraulic braking apparatus so as to raise its operation responsiveness to a higher level, wherein, when the electric-powered braking apparatus is in a state in which it is not operating, the control unit is configured to control the hydraulic braking apparatus according to an output value of a hydraulic pressure sensor configured as the detection unit using as a reference the target hydraulic pressure with a dead-band region having a first width, and wherein, when the control unit acquires operation start information for the electric-powered braking apparatus in a state in which braking is being performed by means of the hydraulic braking apparatus, the control unit is configured to control the hydraulic braking apparatus according to the output value of the hydraulic pressure sensor using as a reference the target hydraulic pressure with a dead-band region having a second width that is smaller than the first width.

10. A braking control apparatus comprising a control unit configured to control: a hydraulic braking apparatus configured to displace, by means of hydraulic pressure, a displacement member to be displaced with respect to a disk rotor; and an electric-powered braking apparatus configured to displace the displacement member by means of a force that differs from the hydraulic pressure, wherein the control unit is configured to control the hydraulic braking apparatus based on information acquired from a detection unit configured to detect information having a correlation with the hydraulic pressure applied to the displacement member, wherein, when the electric powered braking apparatus operates to displace the displacement member in a state in which braking is being performed by means of the hydraulic braking apparatus, the control unit controls the hydraulic braking apparatus so as to suppress fluctuation of the hydraulic pressure, wherein, when the control unit acquires operation start information for the electric-powered braking apparatus in a state in which braking is being performed by means of the hydraulic braking apparatus, the control unit controls the control operation of the hydraulic braking apparatus so as to raise its operation responsiveness to a higher level, wherein, in a state in which the electric-powered braking apparatus is not operating, the control unit is configured to control the hydraulic braking apparatus according to an output value of a hydraulic pressure sensor configured as the detection unit using as a reference a first target hydraulic pressure, and wherein, when the control unit acquires operation start information for the electric-powered braking apparatus in a state in which braking is being performed by means of the hydraulic braking apparatus, the control unit is configured to control the hydraulic braking apparatus according to the output value of the hydraulic pressure sensor using as a reference a second target hydraulic pressure that is greater than the first target hydraulic pressure.

11. A braking control apparatus comprising a control unit configured to control: a hydraulic braking apparatus configured to displace, by means of hydraulic pressure, a displacement member to be displaced with respect to a disk rotor; and an electric-powered braking apparatus configured to displace the displacement member by means of a force that differs from the hydraulic pressure, wherein the control unit is configured to control the hydraulic braking apparatus based on information acquired from a detection unit configured to detect information having a correlation with the hydraulic pressure applied to the displacement member, wherein, when the electric-powered braking apparatus operates to displace the displacement member in a state in which braking is being performed by means of the hydraulic braking apparatus, the control unit controls the hydraulic braking apparatus so as to suppress fluctuation of the hydraulic pressure, wherein, when the control unit acquires operation start information for the electric-powered braking apparatus in a state in which braking is being performed by means of the hydraulic braking apparatus, the control unit controls the control operation of the hydraulic braking apparatus so as to raise its operation responsiveness to a higher level, and wherein, when the control unit acquires operation start information for the electric-powered braking apparatus in a state in which braking is being performed by means of the hydraulic braking apparatus, the control unit is configured to control a current supply operation for supplying a current to an electromagnetic control valve configured to control the flow of the operating fluid which changes the hydraulic pressure, so as to raise the responsiveness of the electromagnetic control valve.

12. The braking control apparatus according to claim 11, wherein, when the control unit acquires operation start information for the electric-powered braking apparatus in a state in which braking is being performed by means of the hydraulic braking apparatus, the control unit performs a current supply control operation for supplying the electromagnetic control valve beforehand with a current at a current level that does not switch the open/closed state of the electromagnetic control valve before the opening/closing control operation for the electromagnetic control valve.

\* \* \* \* \*